United States Patent
Kusakari

(10) Patent No.: US 9,723,140 B2
(45) Date of Patent: Aug. 1, 2017

(54) COMMUNICATION SYSTEM AND INFORMATION PROCESSING DEVICE

(71) Applicant: Shin Kusakari, Kanagawa (JP)

(72) Inventor: Shin Kusakari, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 70 days.

(21) Appl. No.: 14/021,167

(22) Filed: Sep. 9, 2013

(65) Prior Publication Data
US 2014/0079200 A1    Mar. 20, 2014

(30) Foreign Application Priority Data

Sep. 14, 2012  (JP) ................................. 2012-202645
Sep. 3, 2013   (JP) ................................. 2013-182174

(51) Int. Cl.
*H04M 3/42*    (2006.01)
*H04M 3/56*    (2006.01)
(Continued)

(52) U.S. Cl.
CPC ....... *H04M 3/42357* (2013.01); *H04M 3/563* (2013.01); *H04W 4/043* (2013.01); *H04W 4/06* (2013.01); *H04M 2242/30* (2013.01)

(58) Field of Classification Search
CPC ......... H04W 4/02; H04W 4/12; H04W 36/32; H04W 4/14; H04W 68/00; H04W 4/043; H04W 4/06; H04M 3/42357; H04M 3/563
(Continued)

(56) References Cited

U.S. PATENT DOCUMENTS 7,948,437 B2    5/2011  Torimoto et al.
8,165,601 B2 *  4/2012  Naganuma et al. ....... 455/456.1
(Continued)

FOREIGN PATENT DOCUMENTS

CN    101115302 A    1/2008
JP    2005-158007    6/2005
(Continued)

OTHER PUBLICATIONS

Japan Aerospace Exploration Agency (Feb. 28, 2012), "Quasi-Zenith Satellite System Navigation Service—Interface Specification for QZSS version 1.4", 222 pgs.
(Continued)

*Primary Examiner* — Kashif Siddiqui
(74) *Attorney, Agent, or Firm* — Oblon, McClelland, Maier & Neustadt, L.L.P.

(57) ABSTRACT

A communication system with a plurality of information processing terminals and an information processing device communicating with the information processing terminals includes a positional information obtaining unit configured to obtain positional information about the information processing terminals; a converting unit configured to convert the positional information obtained by the positional information obtaining unit into alphanumeric information representing a name of a location which corresponds to the positional information; a transmitting unit configured to, when responding to a request from a first information processing terminal of the information processing terminals, transmit to the first information processing terminal the alphanumeric information obtained in conversion by the converting unit from a second information processing terminal of the information processing terminals; and the location with the alphanumeric information transmitted by the transmitting unit.

16 Claims, 30 Drawing Sheets

(51) Int. Cl.
*H04W 4/04* (2009.01)
*H04W 4/06* (2009.01)

(58) Field of Classification Search
USPC .......................... 455/414.1, 414.3, 456–457
See application file for complete search history.

(56) References Cited

U.S. PATENT DOCUMENTS

| | | | |
|---|---|---|---|
| 8,249,914 B2 | 8/2012 | Umeda | |
| 2002/0032036 A1* | 3/2002 | Nakajima | 455/456 |
| 2005/0148345 A1* | 7/2005 | Kawai | H04W 8/10 |
| | | | 455/456.3 |
| 2007/0005809 A1* | 1/2007 | Kobayashi et al. | 709/250 |
| 2009/0088183 A1* | 4/2009 | Piersol | G01C 21/206 |
| | | | 455/456.1 |
| 2009/0115661 A1* | 5/2009 | Torimoto et al. | 342/387 |
| 2009/0235354 A1* | 9/2009 | Gray et al. | 726/22 |
| 2011/0050493 A1* | 3/2011 | Torimoto | G01S 19/11 |
| | | | 342/357.29 |
| 2011/0086646 A1* | 4/2011 | Gupta | G01S 5/0036 |
| | | | 455/456.1 |
| 2011/0098061 A1* | 4/2011 | Yoon | 455/456.3 |
| 2011/0201359 A1* | 8/2011 | Naganuma | G01S 5/0054 |
| | | | 455/456.6 |
| 2011/0285591 A1* | 11/2011 | Wong | 342/451 |
| 2012/0058775 A1* | 3/2012 | Dupray et al. | 455/456.1 |
| 2012/0094686 A1* | 4/2012 | Suzuki et al. | 455/456.1 |

FOREIGN PATENT DOCUMENTS

| | | |
|---|---|---|
| JP | 4296302 | 7/2009 |
| JP | 2011-160393 | 8/2011 |

OTHER PUBLICATIONS

U.S. Appl. No. 13/784,961, filed Mar. 5, 2013.
U.S. Appl. No. 13/795,383, filed Mar. 12, 2013.
Office Action mailed Dec. 2, 2016 in Chinese Patent Application No. 2013104211191 (with English Translation).

* cited by examiner

FIG.9

| IDENTIFICATION INFORMATION | LATITUDE | LONGITUDE | FLOOR NUMBER | BUILDING NUMBER | RECEIPT DATE AND TIME | DETAILED INFORMATION |
|---|---|---|---|---|---|---|
| 002673abcd01 | 35.668299 | 139.761588 | 16 | A | 11/12/12 13:30:01 | LAPTOP001 |
| 002673abcd02 | 35.460600 | 139.389200 | 15 | C | 11/12/12 13:30:03 | Mr. A |
| 005001abcd03 | 35.460600 | 139.389200 | 6 | C | 11/12/12 13:45:03 | SMPHONE002 |
| 005011abcd04 | 35.460600 | 139.389200 | 6 | C | 11/12/12 13:44:00 | Mr. B |
| 005021abcd05 | 35.460600 | 139.389200 | 6 | C | 11/12/12 13:44:43 | Mr. C |
| ⋮ | ⋮ | ⋮ | ⋮ | ⋮ | ⋮ | ⋮ |

FIG.10

| NAME | SOUTH END | NORTH END | WEST END | EAST END | FLOOR NUMBER | BUILDING NUMBER |
|---|---|---|---|---|---|---|
| RECEPTION ROOM A IN HEAD OFFICE | 35.668250 | 35.668299 | 139.761580 | 139.761649 | 16 | A |
| MEETING ROOM C1505 IN BRANCH OFFICE | 35.460550 | 35.460609 | 139.389150 | 139.389249 | 15 | C |
| FREE SPACE C | 35.460550 | 35.460599 | 139.389150 | 139.389299 | 6 | C |
| ⋮ | ⋮ | ⋮ | ⋮ | ⋮ | ⋮ | ⋮ |

FIG.11

| IDENTIFICATION INFORMATION | DETAILED INFORMATION | CONNECTION INFORMATION | NAME |
|---|---|---|---|
| 002673abcd01 | LAPTOP001 | 133.139.133.35 | RECEPTION ROOM A IN HEAD OFFICE |
| 002673abcd02 | Mr. A | 10.60.100.50 | MEETING ROOM C1505 IN BRANCH OFFICE |
| 005001abcd03 | SMPHONE002 | 10.60.100.21 | FREE SPACE C |
| 005011abcd04 | Mr. B | 10.60.100.23 | FREE SPACE C |
| 005021abcd05 | Mr. C | 10.60.100.25 | FREE SPACE C |
| .. | .. | .. | .. |

FIG.14

PLEASE CHOOSE REMOTE TERMINALS

● RECEPTION ROOM A IN HEAD OFFICE (LAPTOP001)

○ FREE SPACE C (SMPHONE002, Mr. B, Mr. C)

| CONNECT | CANCEL |

FIG.16

| IDENTIFICATION INFORMATION | CONNECTION INFORMATION |
|---|---|
| 002673abcd01 | 03-1234-5678 |
| 002673abcd02 | 046-123-4567 |
| 005001abcd03 | 046-123-6789 |
| : | : |

FIG.19

| LOCATION NAME | LATITUDE | LONGITUDE | FLOOR NUMBER | BUILDING NUMBER | CONNECTION INFORMATION |
|---|---|---|---|---|---|
| RECEPTION ROOM A IN HEAD OFFICE | 35.668299 | 139.761588 | 16 | A | 03-1234-5678 |
| MEETING ROOM C1505 IN BRANCH OFFICE | 35.460600 | 139.389200 | 15 | C | 046-123-4567 |
| FREE SPACE C | 35.460600 | 139.389200 | 6 | C | 046-123-6789 |
| .. | .. | .. | .. | .. | .. |

FIG.32

| IDENTIFICATION INFORMATION | DETAILED INFORMATION |
|---|---|
| 002673abcd01 | LAPTOP001 |
| 005001abcd03 | SMPHONE002 |
| : | : |

FIG.33

| CONNECTION INFORMATION | IDENTIFICATION INFORMATION |
|---|---|
| 133.139.133.35 | 002673abcd01 |

COMMUNICATION SYSTEM AND INFORMATION PROCESSING DEVICE

BACKGROUND OF THE INVENTION

1. Field of the Invention

An aspect of this disclosure is related to a communication system and an information processing device.

2. Description of the Related Art

When a user uses a remote conference system for a remote conference such as a telephone or TV conference, the user is required to specify a remote terminal using a local terminal. Generally, the user has to enter a telephone number, an IP address or a unique ID on the local terminal to specify the remote terminal. Some kinds of conference terminals may display a list of remote terminals, which allow the user to choose one or more remote terminals in the displayed list.

Patent Document 1 discloses a conventional remote conference system which allows the user to choose the name of a conference room displayed on the local terminal in order to start the remote conference with the remote terminal desired by the user.

However, the telephone number or the IP address used to specify the remote terminal of the remote conference is not intuitive for the user because they are just numeric strings. In a case where the list of the remote terminals is displayed on the local terminal, the user finds it hard to specify the remote terminals intuitively because the list merely indicates telephone numbers or IP addresses. Thus, it is difficult for the user to connect the remote terminals to be connected.

An embodiment of this invention aims to provide a communication system, communication method, and broadcasting device, which allows the user to easily connect the remote terminal.

SUMMARY OF THE INVENTION

In an aspect of this disclosure, there is provided a communication system with a plurality of information processing terminals and an information processing device communicating with the information processing terminals, the communication system including a positional information obtaining unit configured to obtain positional information about the information processing terminals; a converting unit configured to convert the positional information obtained by the positional information obtaining unit into alphanumeric information representing a name of a location which corresponds to the positional information; a transmitting unit configured to, when responding to a request from a first information processing terminal of the information processing terminals, transmit to the first information processing terminal the alphanumeric information obtained through conversion by the converting unit from a second information processing terminal of the information processing terminals; and a display unit configured to display the name of the location by the alphanumeric information transmitted by the transmitting unit.

According to another embodiment of this invention, there is provided an information processing device communicating with a plurality of information processing terminals, the information processing device including a positional information obtaining unit configured to obtain positional information about the information processing terminals; a connection information obtaining unit configured to obtain connection information about the information processing terminals; a converting unit configured to convert the positional information obtained by the positional information obtaining unit into alphanumeric information representing a name of a location which corresponds to the positional information; and a transmitting unit configured to, when responding to a request from a first information processing terminal of the information processing terminals, transmit to the first information processing terminal the alphanumeric information obtained in conversion by the converting unit from a second information processing terminal of the information processing terminals as well as the connection information obtained by the connection information obtaining unit from the second information processing terminal.

According to another embodiment of this invention, there is provided a communication system with a plurality of terminals and a control device, which interconnects the terminals, the communication system including a positional information obtaining unit configured to obtain positional information about a first terminal of the terminals; a connection information specifying unit configured to specify, based on the positional information about the first terminal, connection information required by a second terminal of the terminals to connect the first terminal; and a connection unit configured to connect, using the specified connection information, the first terminal and the second terminal.

According to an embodiment of this invention, a communication system, communication method, and broadcasting device are provided which allow the user to easily connect the remote terminal.

BRIEF DESCRIPTION OF THE DRAWINGS

Other objects and further features of embodiments may become apparent from the following detailed description when read in conjunction with the accompanying drawings, in which:

FIG. 9 is a table illustrating a management table for positional information according to an embodiment;

FIG. 10 is a table illustrating a table for associating the name of a location with positional information according to an embodiment;

FIG. 11 is a table illustrating a list of remote terminals according to an embodiment;

FIG. 14 is a drawing illustrating a display screen of an information processing terminal according to an embodiment;

FIG. 16 is a table illustrating a table for associating identification information about an information processing terminal with connection information according to an embodiment;

FIG. 19 is a table illustrating a table for associating the name of a location with positional information and connection information according to an embodiment;

FIG. 32 is a table illustrating a table for associating identification information with detailed information according to an embodiment;

FIG. 33 is a drawing illustrating a configuration of connection information and identification information transmitted by connection information transmitting unit;

DESCRIPTION OF THE PREFERRED EMBODIMENTS

Figure 1:
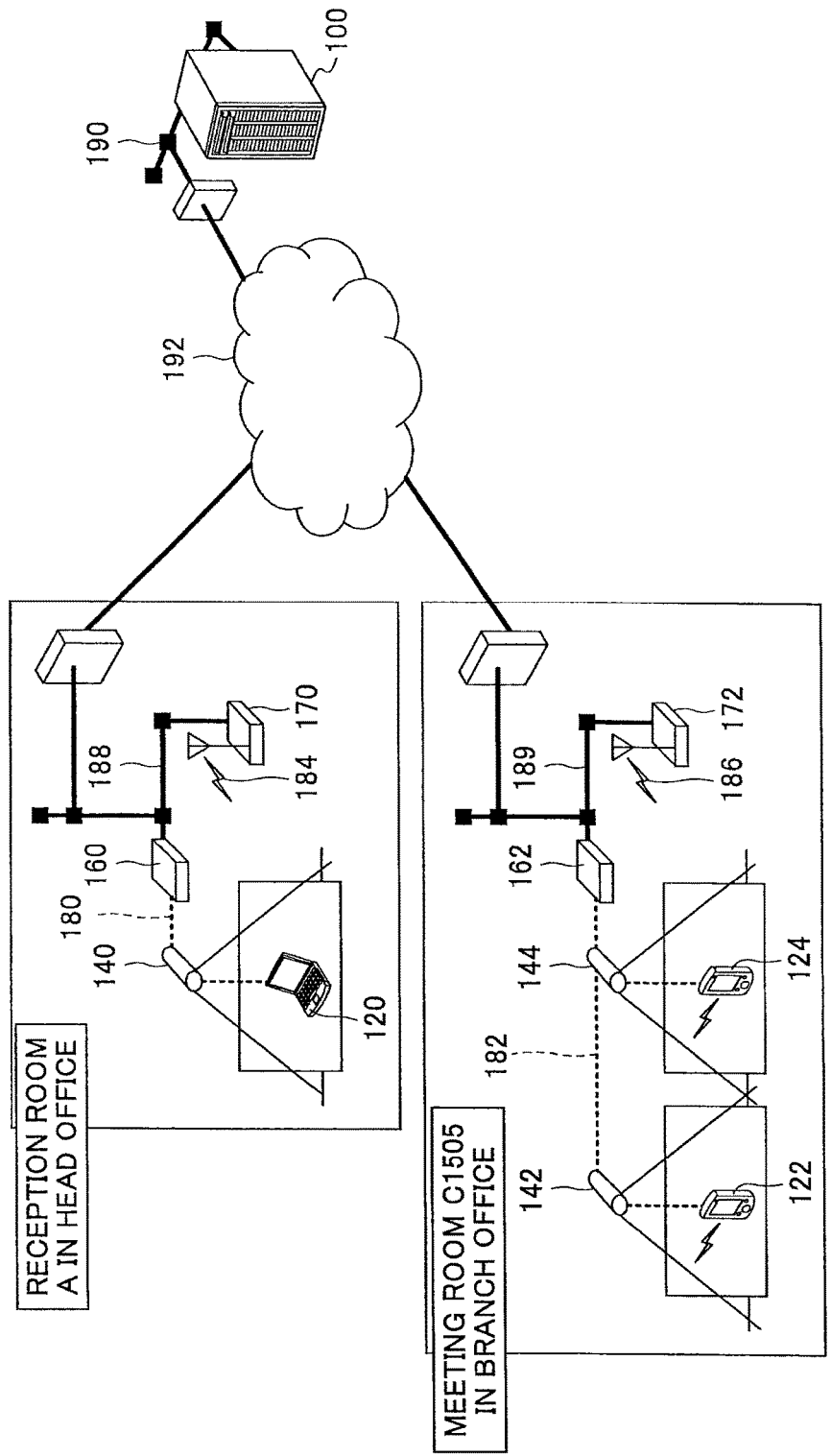
FIG. 1 is a drawing illustrating an overview of a remote conference system according to an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

1. System Overview
2. Hardware Configurations
2.1 Information Processing Device
2.2 Information Processing Terminal
2.3 Broadcasting Device
2.4 Gateway
3. Functions
3.1 Positional Information Management Function
3.2 Terminal Connection Administration Function
4. Process Flow
4.1 Process to Obtain Positional Information
4.2 Process to Administrate Terminal Connection
5. Variants
5.1 First Variant
5.2 Second Variant
5.3 Third Variant (1. System Overview)

FIG. 1 is a drawing illustrating an overview of a remote conference system according to an embodiment. In FIG. 1, a user located in "Reception Room A in the Head Office" and another user located in "Meeting Room C1505 in Branch Office" may join a remote conference using information processing terminals 120, 122, and 124 placed in the rooms, which can communicate with an information processing device 100. In the remote conference, the user, using the terminal, communicates voice, image or text data with another terminal which is in a remote location. Generally, there are two models of systems to implement the remote conference, which are Server-Client and Peer-to-Peer. In the former model, the information processing terminals 120-124 communicate with each other via the information processing device 100 for executing the remote conference. The information processing terminals 120-124 generally provide user interface functions (e.g. voice input/output, and image input/output). In the latter model, the information processing device 100 administrates connections among the information processing terminals 120-124 executing the remote conference. Information processing terminals 120-124 connect with the information processing device 100 and obtain connection information (e.g. an IP address) of the other terminals to execute the conference. The information processing terminals 120 and 122 may connect with each other and execute the remote conference using the connection information obtained from the information processing device 100. In both models, the user of the terminal has to specify another terminal (hereinafter called a "remote terminal") to execute the remote conference. Although this invention does not depend on such models, the following explanation is done using the latter model for illustration purposes.

The information processing terminals 120-124 are conference terminals which have software and hardware required to execute the remote conference. The user may conduct the remote conference with a remote user using the information processing terminal. For example, the information processing terminal 120 is a laptop placed in "Reception Room A in Head Office" in FIG. 1, and the information processing terminals 122, 124 are smart phones, cell phones or tablets held by the users located in "Meeting Room C1505 in Branch Office". The information processing terminal may be any device which may execute the remote conference. For example, the information processing terminal may be a desktop computer, a projector or other dedicated terminal for the remote conference.

The information processing terminals 120-124 communicate with the information processing device 100 via internal networks such as personal area networks 180, 182 and local area networks 188, 189, a network 192 such as a cloud network, and an external network 190 to which the information processing device 100 is connected. The internal network includes personal area networks 180, 182 (illustrated by dashed lines in FIG. 1) and wireless networks 184, 186 (access points 170, 172 for a wireless LAN is illustrated in FIG. 1). PANs 180, 182 may be used to transfer positional information of the information processing terminals 120-124 to the information processing device 100 prior to the beginning of the remote conference. Wireless networks 184, 186 may be used to communicate necessary information for the remote conference. Generally, the wireless networks 184, 186 are wider and faster networks than the PANs 180, 182.

After starting up, at any timing, the information processing terminals 120-124 transmit identification information assigned to them (e.g. a MAC address) and present positional information (e.g. a degree of latitude and longitude) to the information processing device 100 via the PANs 180, 182. The present positional information may be obtained from positioning signals transmitted by broadcasting devices 140-144 placed on the ceiling of a room. Next, each information processing terminal transmits to the information processing device 100 the necessary information in order to establish a connection for the remote conference via the wireless networks 184, 186. At this time, the identification information about the information processing terminals is also transmitted. When starting the remote conference in response to an instruction from the user, the information processing terminals 120-124 transmit to the information processing device 100 requests for a list of remote terminals (described later in detail) including information about information processing terminals to be connected. After receiving the list of remote terminals from the information processing device 100, the information processing terminals 120-124 display the information about the remote terminals on the screens and allow the user to choose the remote terminal. The list of remote terminals includes information about the remote terminals, the name of locations where the remote terminals are, and the connection information about the remote terminals. The information processing terminals 120-124 display the names of the locations where the remote terminals are, and information about the remote terminals on the screens as shown in FIG. 14 (described later in detail). The user who knows the name of a location where an other party is may take a glance at the name of the location and the information about the remote terminals displayed on the screen. As a result, the user may specify the remote terminals quickly and intuitively. When the remote terminal is specified, the information processing terminals 120-124 try to connect with the remote terminal using the connection information obtained. As stated above, in the system according to the peer-to-peer model, the information processing terminals try to connect with the remote terminal specified by the user using the connection information included in the list of remote terminals. On the contrary, in the system according to the Server-Client model, the information processing terminals notify the information processing device 100 of the name or identification information of the specified remote terminal.

Figure 2:
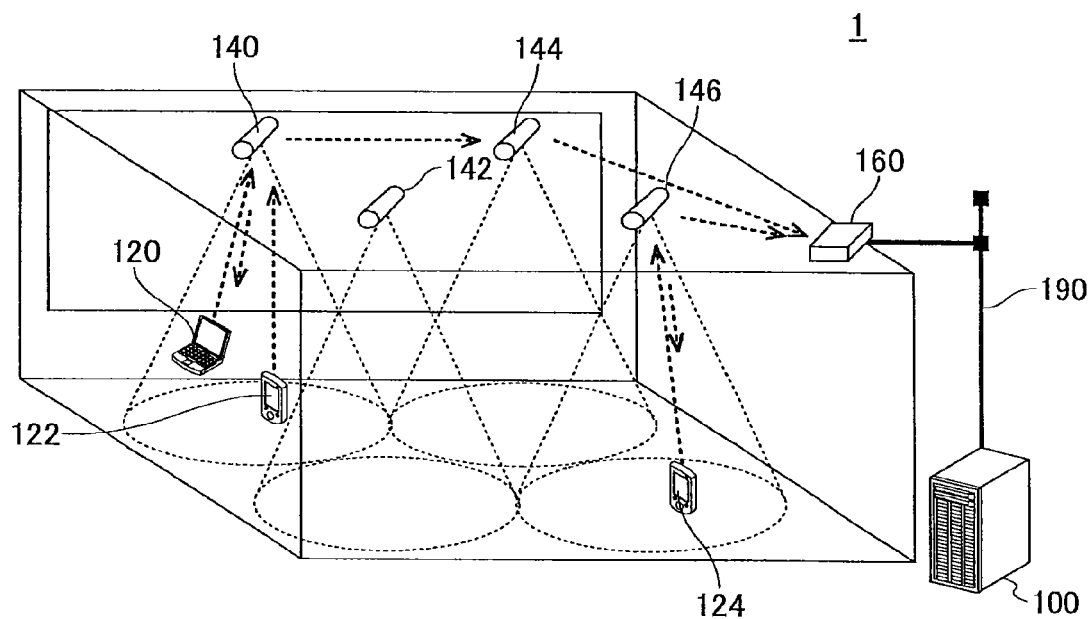
FIG. 2 is a drawing illustrating an exemplary configuration of a PAN used in to an embodiment.
Figure 3:
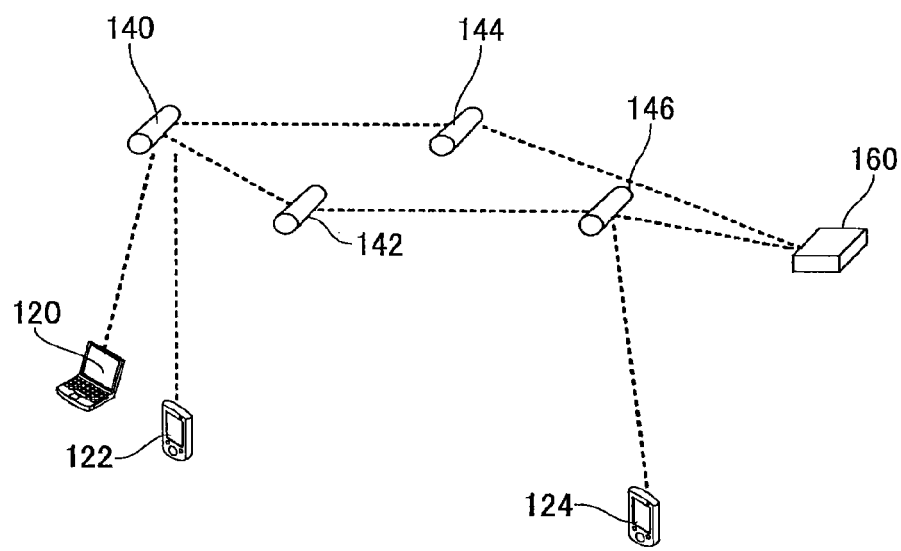
FIG. 3 is a drawing illustrating an exemplary configuration of a PAN used in to an embodiment.

With reference to FIGS. 2, 3, the method is explained for obtaining the positional information from the broadcasting devices performed by the information processing devices. Also, configurations of PANs 180, 182 are illustrated in FIGS. 2, 3. The configurations shown in FIGS. 2, 3 are different from FIG. 1. As a result, the user is allowed to specify the remote terminals easily even if the remote terminals to be connected are mobile devices.

FIG. 2 is a drawing illustrating PAN 180 including the information processing terminals 120, 122, 124, the broadcasting devices 140, 142, 144, 146, and the gateway 160. The PAN 180 may be formed according to a short range wireless communication technology such as ZigBee™.

The broadcasting devices 140-146 have an IMES transmitter which transmits the positioning signal according to IMES (Indoor Messaging System) standard. IMES standard is one of the indoor positioning technologies called as "Indoor GPS". The broadcasting devices 140-146 always transmit the positioning signal including the positional information indicating the location where the broadcasting devices are installed to a defined area (e.g. within a 5 m radius). The positional information includes information about a degree of latitude and longitude, altitude, a floor number, and a building number. The information processing terminals 120-124 have an IMES receiver, which allows the information processing terminals 120-124 to receive the positioning signal and obtain the positional information.

The broadcasting devices 140-146 may operate as "ZigBee Router" in ZigBee™ standard, which may relay data transmitted by the information processing terminals to the gateway 160. In this case, the information processing terminals 120-124 operate as "ZigBee End Device".

The gateways 160, 162 interconnects the PANs 180, 182 and the external network 190, and may convey data transferred from the PANs 180, 182 to the network 190. When The PANs 180, 182 are formed conforming to ZigBee™ and the external network 190 is a LAN formed conforming to IEEE 802.3 standard, the gateways may convert the data between the networks. The gateways 160, 162 may operate as "ZigBee Coordinator" which may form and administrate the PANs.

As stated above, the information processing terminals 120-124 may receive the positioning signals transmitted by the broadcasting devices 140-146 to obtain the present positional information. The information processing terminals 120-124 may then transmit the positional information to the information processing device 100.

FIG. 3 simply shows the information processing terminals 120-124, the broadcasting devices 140-146, and the gateway 160 included in the PAN 180 shown in FIG. 2. As shown in FIG. 3, the information processing terminals 120-124 may transmit the positional information to the nearest broadcasting device. Therefore, the information processing terminals 120-124 may communicate with the nearest broadcasting device by emitting electric waves with power which is enough to reach the nearest broadcasting device. The power is relatively lower than the power normally required to emit electric waves so as to only reach a single access point.

Again referring to FIG. 1, the information processing device 100 may store the identification information and the positional information received from the information processing terminals 120-124 (See FIG. 9, described later for details). The information processing device 100, using the identification information, associates the connection information about the information processing terminals 120-124 with the positional information, and stores them in the list of remote terminals (See FIG. 11, described later for details). The positional information which is expressed as a degree of latitude and longitude is converted into the name of a location which is easy to be understood by the user (e.g. "Reception Room A in Head Office" or "Meeting Room C1505 in Branch Office). FIG. 10 shows an example of a table associating the positional information with the name of a location required for the conversion (described later for details). The information processing device 100 transmits the list of remote terminals to the information processing terminals in response to the requests from them.

The above stated configuration allows the information processing terminals 120-124 to display a list of the remote terminals for the remote conference using the names of the locations where the remote terminals are placed. As a result, the user may easily specify the remote terminals to be connected.

(2. Hardware Configurations)

With reference to FIGS. 4-7, hardware configurations are explained for the information processing device 100, the information processing terminal 120, the broadcasting device 140, and the gateway 160 according to an embodiment of this invention.

(2.1 Information Processing Device)

Figure 4:
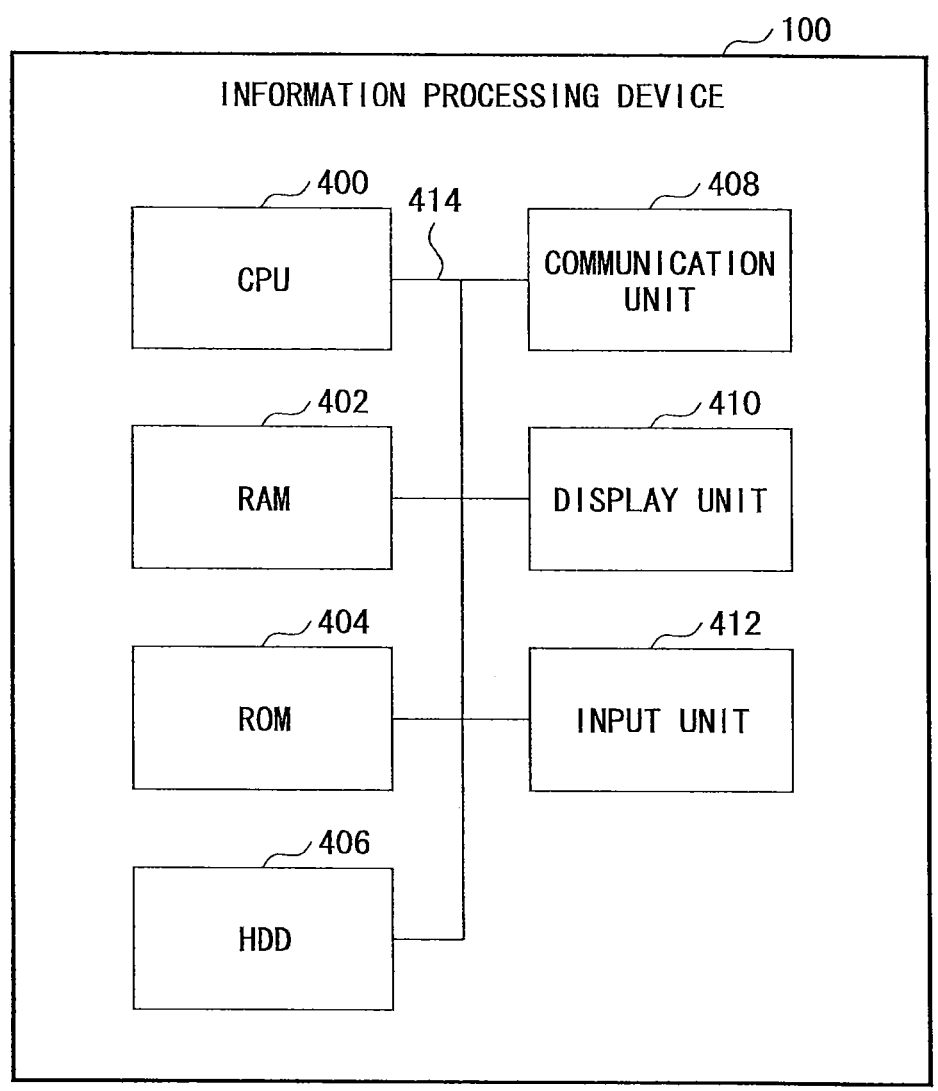
FIG. 4 is a block diagram illustrating an exemplary hardware configuration of an information processing device according to an embodiment.

FIG. 4 shows an exemplary hardware configuration of the information processing device 100 according to an embodiment of this invention. The information processing device 100 includes a CPU 400, a RAM 402, a ROM 404, a HDD 406, a communication unit 408, a display unit 410, an input unit 412, and a bus 414.

The CPU 400 executes programs controlling the information processing device 100. The RAM 402 may operate as a working memory for the CPU 400. The ROM 404 stores system programs for the information processing device 100. The HDD 406 stores programs and data for the operating system or applications. The HDD 406 may be replaced with any storage device such as a tape drive or optical disk drive. The communication unit 408 is a device to communicate with an external device. The communication unit 408 may include an interface to connect with the LAN according to the IEEE 802.3 standard. The display unit 410, such as a liquid crystal display, may visually provide information to the user. The input unit 412, such as a keyboard or a mouse, may accept input from the user. The bus 414 interconnects the above units electrically.

With the above stated configuration, the information processing device 100 manage the positional information and the connection information about the information processing terminals which may connect to the remote conference.

(2.2 Information Processing Terminal)

Figure 5:
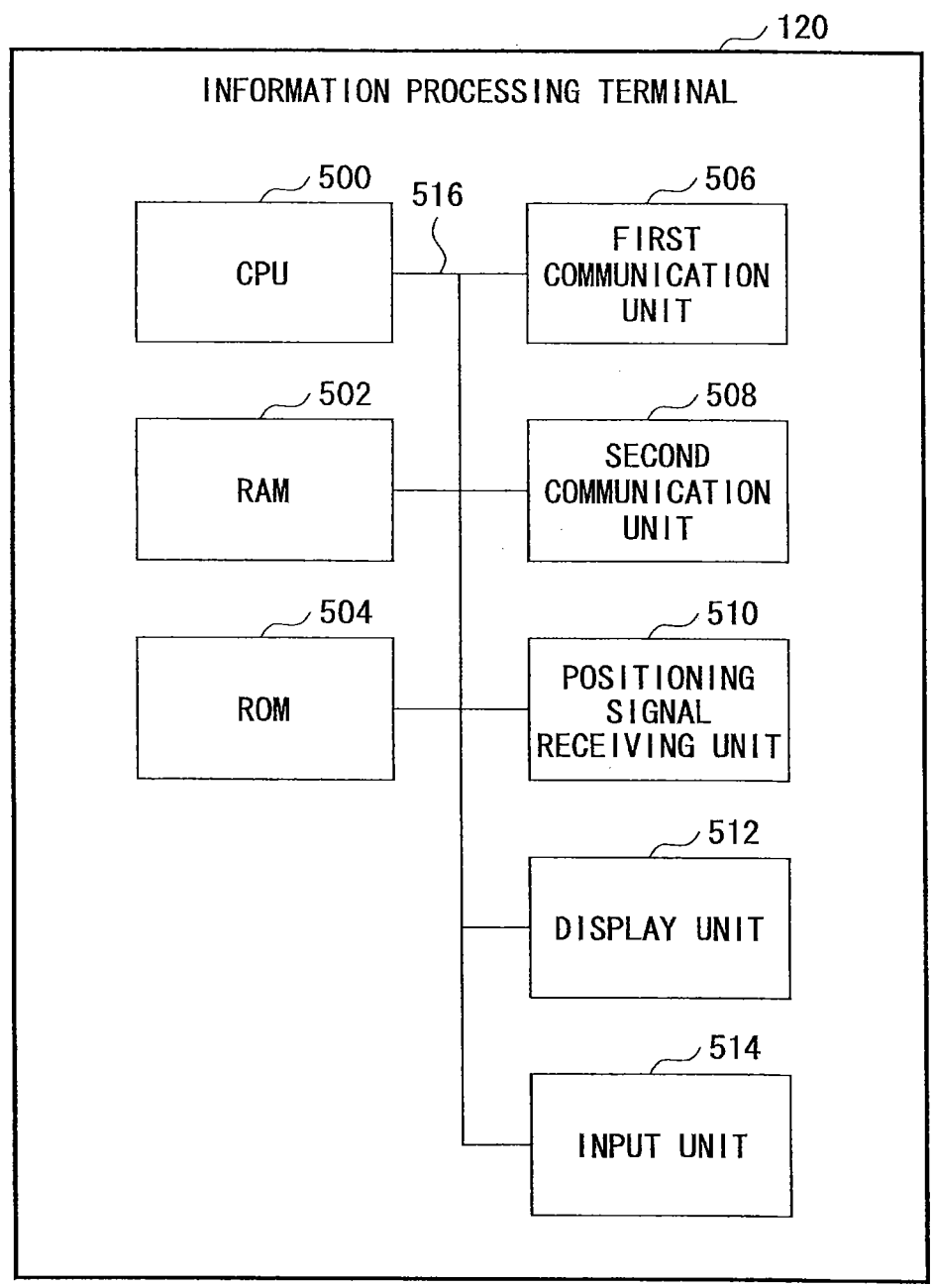
FIG. 5 is a block diagram illustrating an exemplary hardware configuration of an information processing terminal according to an embodiment.

FIG. 5 shows an exemplary hardware configuration of the information processing terminals 120-124 (the following explanation refers to only the information processing terminal 120) according to an embodiment of this invention. The information processing terminal 120 includes a CPU 500, a RAM 502, a ROM 504, a first communication unit 506, a second communication unit 508, a positioning signal receiving unit 510, a display unit 512, an input unit 514, and a bus 516.

The CPU 500 executes programs controlling the information processing terminal 120. The RAM 502 may operate as a working memory for the CPU 500. The ROM 504 stores programs executed by the CPU 500 and data required by the programs. Also, the ROM 504 may store user applications and data. The first communication unit 506 is a device to communicate with an external device according to a short range wireless communication technology such as ZigBee™ or Bluetooth™. The second communication unit 508 is a device to communicate with an external device according to a wireless communication technology such as WiFi™ or Long Term Evolution (LTE). The positioning signal receiving unit 510 is a device to receive the positioning signal transmitted by the broadcasting device 140. The positioning signal receiving unit 510 may receive the positioning signal including a frame format defined in IMES standard, for example. The display unit 512, such as a liquid crystal display, may visually provide information to the user. The input unit 514, such as a touch panel or mechanical buttons, may accept input from the user. The bus 516 interconnects the above units electrically.

With the above stated configuration, the information processing terminal 120 according to an embodiment of this invention may obtain the present positional information using the positioning signal transmitted by the broadcasting device 140. In addition, the information processing terminal 120 may communicate with the information processing device 100 via the PAN or the wireless network.

(2.3 Broadcasting Device)

Figure 6:
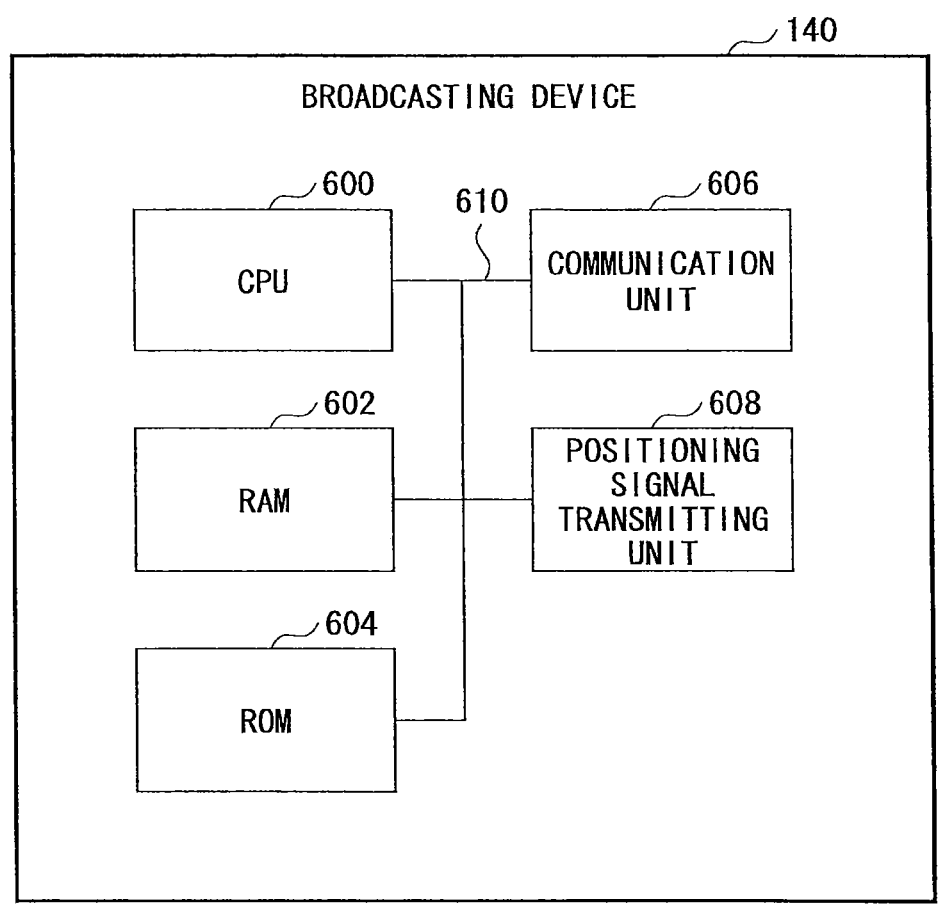
FIG. 6 is a block diagram illustrating an exemplary hardware configuration of a broadcasting device according to an embodiment.

FIG. 6 shows an exemplary hardware configuration of the broadcasting devices 140-144 (the following explanation refers to only the broadcasting device 140) according to an embodiment of this invention. The broadcasting device 140 includes a CPU 600, a RAM 602, a ROM 604, a communication unit 606, a positioning signal transmitting unit 608, and a bus 610.

The CPU 600 executes programs controlling the broadcasting device 140. The RAM 602 may operate as a working memory for the CPU 600. The ROM 604 stores programs executed by the CPU 600 and data required by the programs. The communication unit 606 is a device to communicate with an external device according to a short range wireless communication technology such as ZigBee™ or Bluetooth™. The positioning signal transmitting unit 608 is a device to transmit the positioning signal used by the information processing terminal 120 for the positioning. The positioning signal transmitting unit 608 may transmit the positioning signal including a frame format defined in IMES standard, for example. In particular, the positioning signal transmitting unit 608 modulates a 1.5 GHz carrier wave using data including the frame structure defined in IMES standard, and emits the modulated wave with an antenna. The bus 610 interconnects the above units electrically.

With the above stated configuration, the broadcasting device 140 according to an embodiment of this invention may transmit the positioning signal required by information processing terminal 120 for the positioning. Also the broadcasting device 140 may relay data between the information processing terminal and the information processing device 100 (or the gateway 160).

(2.4 Gateway)

Figure 7:
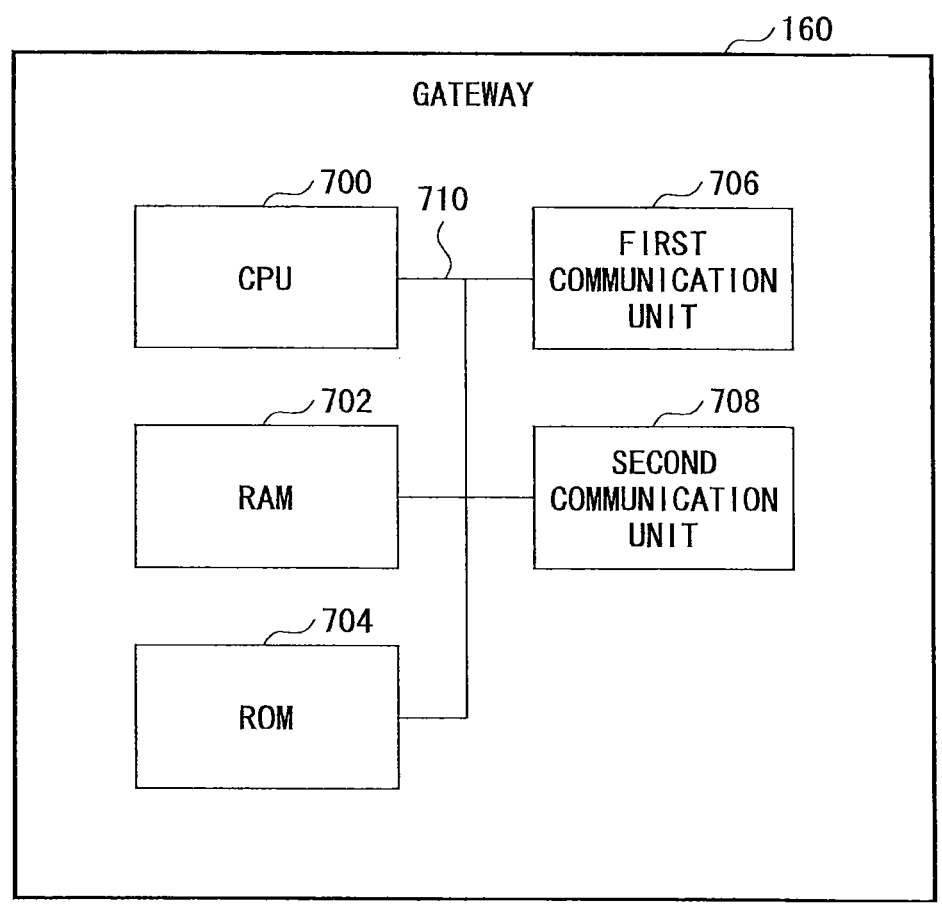
FIG. 7 is a block diagram illustrating an exemplary hardware configuration of a gateway according to an embodiment.

FIG. 7 shows an exemplary hardware configuration of the gateway 160 according to an embodiment of this invention. The gateway 160 includes a CPU 700, a RAM 702, a ROM 704, a first communication unit 706, a second communication unit 708, and a bus 710.

The CPU 700 executes programs controlling the gateway 160. The RAM 702 may operate as a working memory for the CPU 700. The ROM 704 stores programs executed by the CPU 700 and data required by the programs. The first communication unit 706 is a device to communicate with an external device according to a short range wireless communication technology such as ZigBee™ or Bluetooth™. The second communication unit 708 is a device to communicate with an external device. The communication unit 408 may include an interface to connect with the LAN according to IEEE 802.3 standard. The bus 710 interconnects the above units electrically.

With the above stated configuration, the gateway 160 according to an embodiment of this invention interconnects the PAN 180 including the broadcasting device 140 and the information processing terminal 120 and the network 192 including the information processing device 100.

(3. Functions)

Figure 8:
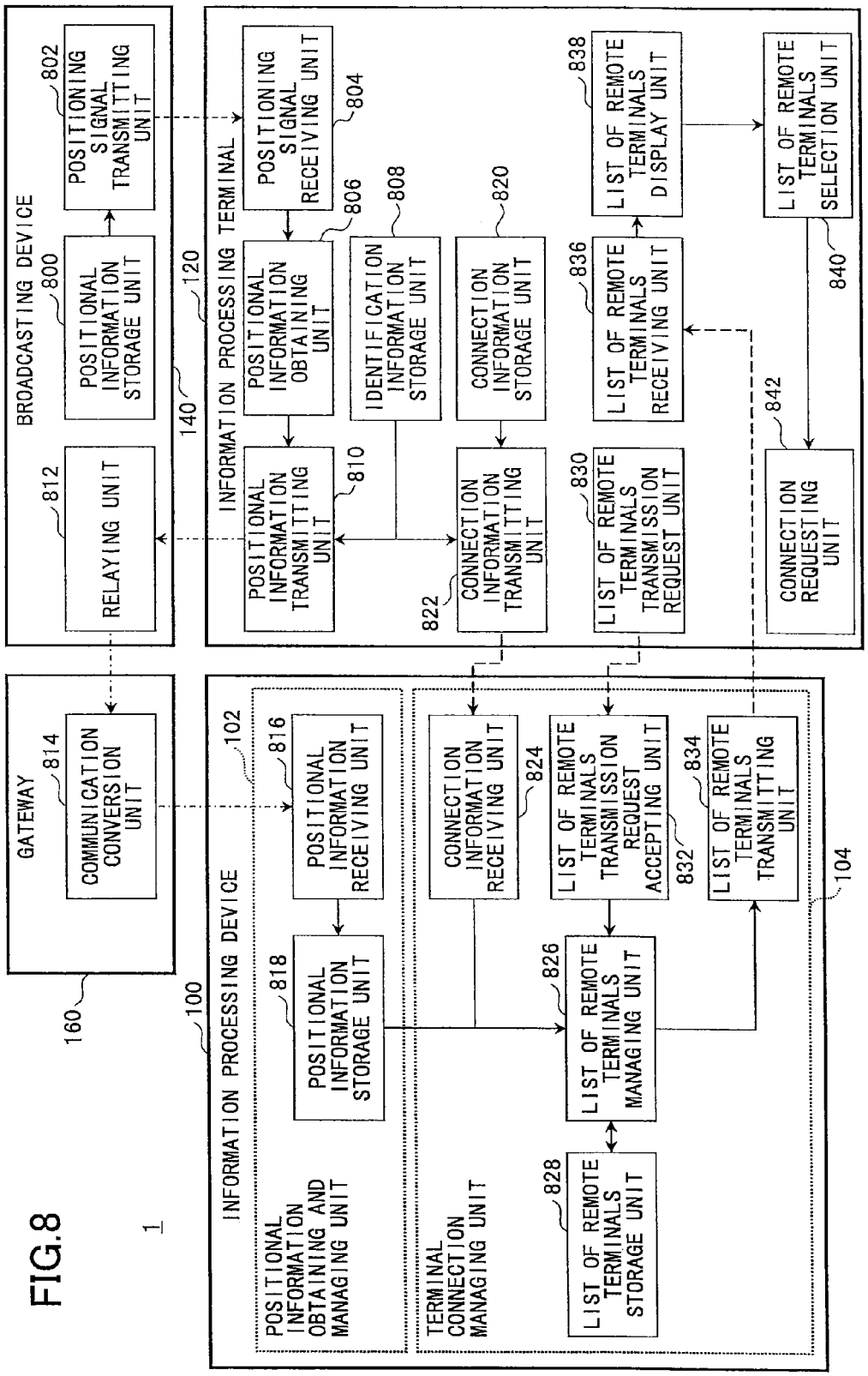
FIG. 8 is a block diagram illustrating exemplary functional configurations of an information processing device, information processing terminal, a broadcasting device, and a gateway according to an embodiment.

With reference to FIG. 8, the configuration of the functional block is explained for the information processing device 100, the information processing terminal 120, the broadcasting device 140, and the gateway 160. The block diagram shown in the FIG. 8 includes some of various elements of the above devices, which are especially related to the description of the embodiment. The functions of the information processing device 100, the information processing terminal 120, the broadcasting device 140, and the gateway 160 are explained separately in two parts "Positional Information Management Function" and "Terminal Connection Administration Function".

(3.1 Terminal Connection Administration Function)

First, the function is explained in which the information processing terminal 120 obtains the positional information using the positioning signal received from the broadcasting device 140, and the information processing device 100 receives and administrates the positional information about the information processing terminal 120.

The broadcasting device 140 according to an embodiment of this invention has a positional information storage unit 800 and a positional signal transmitting unit 802 (a relaying unit 812 is described later).

The positional information storage unit 800 stores the positional information indicating the location where the broadcasting device 140 is installed. The positional information may include information about a degree of latitude and longitude, a floor number, or a building number. The positional information may be set by an administrator of the broadcasting device 140 in advance.

The positioning signal transmitting unit 802 creates the positioning signal including the positional information stored in the positional information storage unit 800 and transmits the positional information to the information processing terminal 120. The positioning signal may be formed according to the frame structure defined by IMES standard. In FIG. 8, the arrow with dashed line drawn from the positioning signal transmitting unit 802 of the broadcasting device 140 to the positioning signal receiving unit 804 of the information processing terminal 120 indicates a flow of logical data between the units. Other dashed lines in FIG. 8 also indicate flows of logical data between the units.

The information processing terminal 120 according to an embodiment of this invention has the positioning signal receiving unit 804, positional information obtaining unit 806, an identification information storage unit 808, and a positional information transmitting unit 810.

The positional signal receiving unit 804 receives the positioning signal transmitted by the broadcasting device 140. The positioning signal receiving unit 804 conveys the received positioning signal to the positional information obtaining unit 806.

The positional information obtaining unit 806 obtains the positional information from the positioning signal received from the positioning signal receiving unit 804 according to IMES standard. The positional information may include a degree of latitude and longitude, a floor number, and a building number. The positional information obtaining unit 806 conveys the positional information to the positional information transmitting unit 810.

The identification information storage unit 808 stores the identification information about the information processing terminal 120. The identification information may be any information which is unique to the information processing terminal 120 (i.e. may be different from other information processing terminals). Exemplary identification information may be a MAC address assigned to the information processing terminal 120, which may be used to identify the information processing terminal 120.

The positional information transmitting unit 810 transmits to the information processing device 100 the positional information obtained by the positional information obtaining unit 806 and the identification information stored in the identification information storage unit 808. Here, both information is relayed by the broadcasting device 140 and the gateway 160 (i.e. via the PAN 180), and then transferred to the information processing device 100. The information processing terminal 120 may communicate with the nearest broadcasting device 140, which allows a reduction in power consumption of the information processing terminal 120. The detailed relaying process performed by the broadcasting device 140 and the gateway 160 is described later. The positional information transmitting unit 810 may transmit the positional information and the identification information at any timing (e.g. when the information processing terminal 120 is turned on or the remote conference software is started). In addition, the positional information transmitting unit 810 may transmit the positional information and the identification information in a predetermined interval or when movements of the information processing terminal 120 are detected by an acceleration sensor (not shown in FIG. 5).

The broadcasting device 140 according to an embodiment of this invention further has the relaying unit 812.

The relaying unit 812 relays the information transmitted by the information processing device 100 for the information processing terminal 120. The relayed information is transferred to the information processing device 100 via the gateway 160.

The gateway 160 according to am embodiment of this invention has a communication conversion unit 814.

The communication conversion unit 814 converts data received from the broadcasting device 140 so that the data is suitable for the external network (e.g. the internal network 188 in FIG. 1). The communication conversion unit 814 transmits the converted data to the information processing device 100 via the cloud network 192.

The information processing device 100 according to am embodiment of this invention has a positional information receiving unit 816 and a positional information storage unit 818. Here, a functional block to implement the positional information management function in the information processing device 100 is collectively referred as a "positional information obtaining and managing unit 102".

The positional information receiving unit 816 receives the identification information and the positional information transmitted by the information processing terminal 120. The received identification information and the positional information are stored in the positional information storage unit 818.

The positional information storage unit 818 stores the received identification information and the positional information about the information processing terminal 120. The positional information storage unit 818 may also store the receipt date and time of the information and detailed information about the information processing terminal 120. FIG. 9 shows a table on which the positional information storage unit 818 stores the information. The table shown in FIG. 9 includes identification information, degree of latitude, longitude, a floor number, a building number, receipt date and time, and detailed information. The identification information is the identification information about the information processing terminal 120 (e.g. a MAC address). The degree of latitude, longitude, the floor number and the building number may be included in the positional information received from the information processing terminal 120. The information originates from the positional information indicated in the positioning signal which is received by the information processing terminal 120 from the nearest broadcasting device 140. The receipt of date and time indicates the data and time when the positional information receiving unit 816 receives the identification information and the positional information from the information processing terminal 120. The detailed information indicates information about a model, a type number, a serial number or an owner of the information processing terminal 120. The detailed information is associated with the identification information about the information processing terminal 120 with a table shown in FIG. 32 in advance. The table associating the identification information with the detailed information may be stored in the information processing device 100 in advance or obtained from an external server.

With the above stated function, the information processing terminal 120 in the remote conference system 1 according to an embodiment of this invention may manage the location of information processing terminals based on the positional information obtained by the information processing terminal.

In addition, the positional information transmitting unit 810 of the information processing terminal 120 may transmit to the information processing device 100 the positional information and the identification information via a base station for a cell phone network or an access point for a wireless LAN. That eliminates the need for the communication conversion process of the gateway 160.

(3.2 Terminal Connection Administration Function)

Second, a series of the functions for the connection administration process performed in the information processing device 100 and the information processing terminal 120.

The information processing terminal 120 according to an embodiment of this invention has a connection information storage unit 820 and a connection information transmitting unit 822.

The connection information storage unit 820 stores the connection information about the information processing terminal 120. The connection information is used by other information processing terminals to perform the remote conference with the information processing terminal 120. For example, the connection information is an IP address in the internal networks 180, 184, or 188 (or the cloud network 192).

The connection information transmitting unit 822 may transmit to the information processing device 100 the connection information stored in the connection information storage unit 820 via the wireless network 184 such as a wireless LAN, which is used for the remote conference. In this case, the connection information transmitting unit 822 may also transmit the identification information about the information processing terminal 120 stored in the identification information storage unit 808. FIG. 33 shows an example of the connection information and the identification information transmitted by the connection information transmitting unit 822. The connection information transmitting unit 822 may transmit this information at the time either when the positional information transmitting unit 810 transmits the positional information or when the user using the information processing terminal 120 starts the remote conference software.

The information processing device 100 according to an embodiment of this invention further has a connection information receiving unit 824, a list of remote terminals managing unit 826, a list of remote terminals storage unit 828, a list of remote terminals transmission request accepting unit 832, and a list of remote terminals transmitting unit 834. Here, a functional block to implement the terminal connection administration function in the information processing device 100 is collectively referred as "a terminal connection managing unit 104".

The connection information receiving unit 824 receives the connection information and the identification information from the information processing terminal 120. The connection information receiving unit 824 conveys the received connection information and the identification information to the list of remote terminals managing unit 826.

The list of remote terminals managing unit 826 obtains and associates the connection information about the information processing terminal 120 with the positional information and the detailed information stored in the positional information storage unit 818 using the identification information about the information processing terminal 120, and then stores them to the list of remote terminals. In responding to a request from the information processing terminal 120, the list of remote terminals managing unit 826 loads the list of remote terminals and then causes the list of remote terminals transmitting unit 834 to transmit the list.

FIG. 11 shows the information included in the list of remote terminals in the form of a table. The list of remote terminals includes the identification information, the detailed information, the connection information about the information processing terminal 120 and the name of the location where the information processing terminal 120 is. The name of the location is a name of a conference room or an office space in a building or facility corresponding to the positional information.

Figure 34:
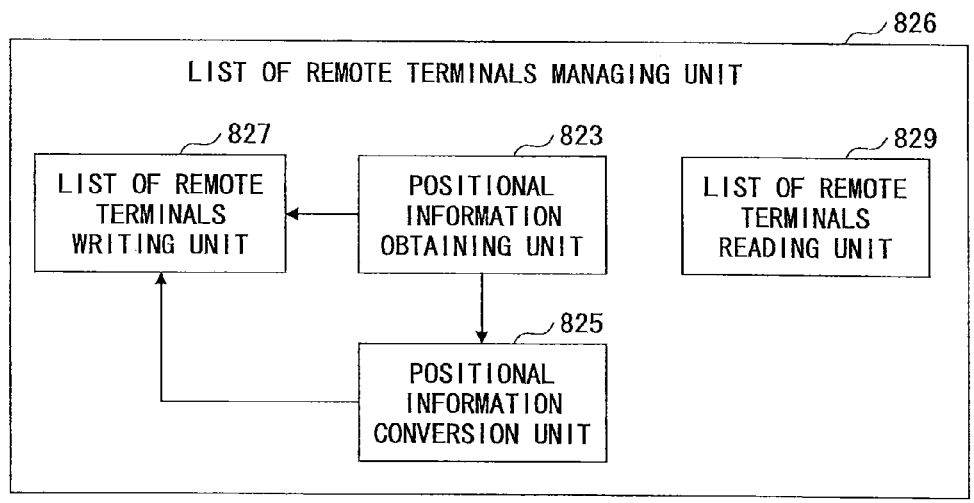
FIG. 34 is a detailed block diagram illustrating exemplary functional configurations of a list of remote terminals administrating unit.

FIG. 34 shows a detailed functional block of the list of remote terminals managing unit 826. The list of remote terminals managing unit 826 has positional information obtaining unit 823, a positional information conversion unit 825, a list of remote terminals writing unit 827, and a list of remote terminals reading unit 829.

When the positional information obtaining unit 823 receives the identification information and the connection information from the connection information receiving unit 824, the positional information obtaining unit 823 obtains the positional information about the information processing terminal 120 (See FIG. 9) using the received identification information. Next, the positional information obtaining unit 823 conveys the degree of latitude and longitude, the floor number, and the building number from the obtained positional information (degree of latitude, longitude, a floor number, a building number, receipt data and time, and detailed information) to the positional information conversion unit 825. In addition, the positional information obtaining unit 823 conveys the identification information, the connection information, and the detailed information to the list of remote terminals writing unit 827.

The positional information conversion unit 825 reads the table shown in FIG. 10, and converts the degree of latitude and longitude, the floor number, and the building number received from the positional information obtaining unit 823 into the name of the location. In the table shown in FIG. 10, the names of locations are defined by a range of degree of latitude and longitude, a floor number, and a building number. The positional information conversion unit 825 conveys the obtained name of the location to the list of remote terminals writing unit 827.

The list of remote terminals writing unit 827 writes into the list of remote terminals stored in the list of remote terminals storage unit 828 the identification information, the connection information, and the detailed information received from the positional information obtaining unit 823 and the name of the location received from the positional information conversion unit 825. When receiving the connection information from the information processing terminal 120 and the list of remote terminals does not exist, the list of remote terminals managing unit 826 may create the list of remote terminals. When an entry of the received identification information in the list of remote terminals already exists, the list of remote terminals managing unit 826 may update the existing entry with the newly received information.

The list of remote terminals reading unit 829 reads the list of remote terminals stored in the list of remote terminals when the list of remote terminals transmission request accepting unit 832 accepts a list of remote terminals transmission request from the information processing terminal 120. The list of remote terminals reading unit 829 conveys the list of remote terminals to the list of remote terminals transmitting unit 834.

The list of remote terminals reading unit 829 may convey some or all of the entries in the list of remote terminals. For example, when the list of remote terminals transmission request is received from the information processing terminal 120, the entry of the information processing terminal 120 may be eliminated. When the remote conference system operates in the Client-Server model and the information processing device 100 manages connections of the information processing terminals, the connection information may be eliminated and not transmitted to the information processing terminal.

Figure 20:
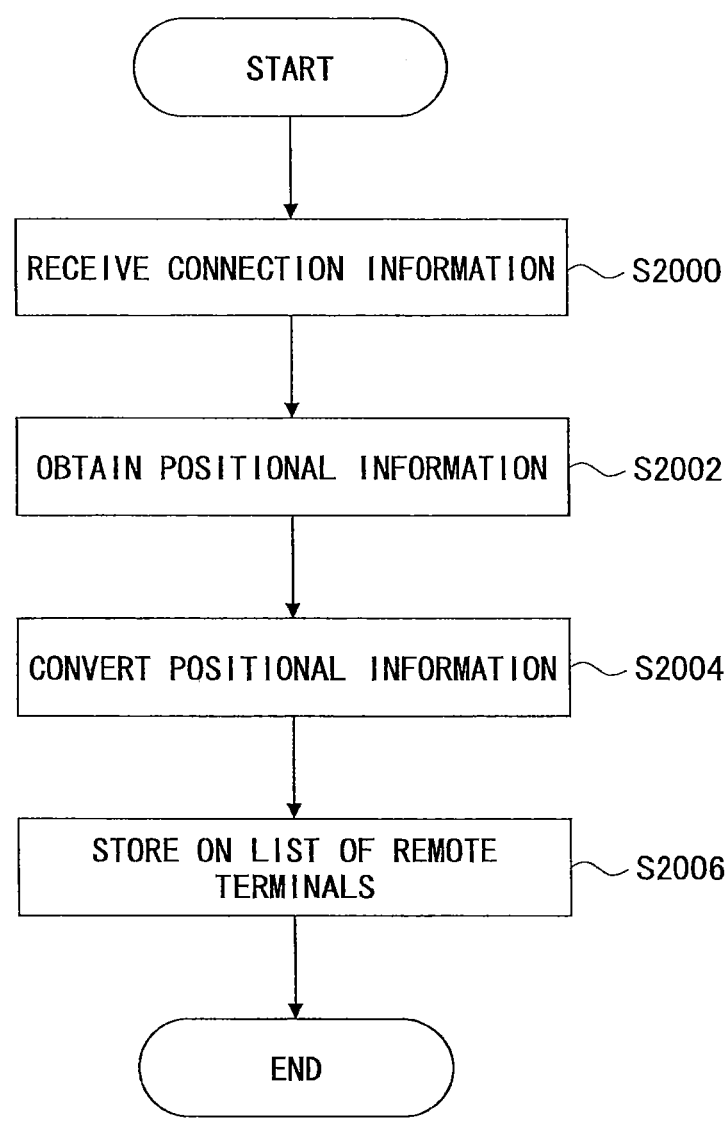
FIG. 20 is a flowchart illustrating a process of creating a list of remote terminals according to an embodiment.

FIG. 20 shows a flowchart of the updating process for the list of remote terminals.

First, the connection information receiving unit 824 receives the connection information and the identification information from the information processing terminal 120 (Step S2000).

Second, the positional information obtaining unit 823 of the list of remote terminals managing unit 826 obtains the positional information about the information processing terminal 120 from the positional information storage unit 818 using the identification information received along with the connection information (Step S2002).

Next, the positional information conversion unit 825 of the list of remote terminals managing unit 826 converts the obtained positional information into the name of the location using the table shown in FIG. 10 (Step S2004).

The list of remote terminals writing unit 827 of the list of remote terminals managing unit 826 stores on the list of remote terminals (1) the identification information about the information processing terminal 120 received in Step S2000, (2) the detailed information which is specified with the identification information and included in the management table for positional information shown in FIG. 9, (3) the connection information about the information processing terminal 120 received in Step S2000, (4) the name of the location obtained by the conversion in Step S2004 (Step S2006).

FIG. 11 shows the updated list of remote terminals. The process illustrated by the flowchart shown in FIG. 20 may be executed repeatedly.

The list of remote terminals storage unit 828 stores the list of remote terminals created and updated by the list of remote terminals managing unit 826.

The list of remote terminals transmission request accepting unit 832 accepts a list of remote terminals transmission request from the information processing terminal 120.

The list of remote terminals transmitting unit 834 transmits the list of remote terminals to the information processing terminal 120. The list of remote terminals may be conveyed via the broad wireless network 184 such as a wireless LAN used for the remote conference.

The information processing terminal 120 according to an embodiment of this invention also has a list of remote terminals transmission request unit 830, a list of remote terminals receiving unit 836, a list of remote terminals display unit 838, a list of remote terminals selection unit 840, and a connection requesting unit 842.

The list of remote terminals transmission request unit 830, when the information processing terminal 120 starts the remote conference, transmits to the information processing device 100 a list of remote terminals transmission request for transmitting the list of remote terminals including information about candidate remote terminals.

The list of remote terminals receiving unit 836 receives the list of remote terminals from the information processing device 100. The list of remote terminals receiving unit 836 passes the received list of remote terminal to the list of remote terminals display unit 838.

The list of remote terminals display unit 838 displays the contents of the list of remote terminals, which is received by the list of remote terminals receiving unit 836, on the screen. FIG. 11 shows a display example in which the information processing terminal 120, which has the identification information "002673abcd02", is in "Meeting Room C1505 in Branch Office", and the list of remote terminals shown in FIG. 14 is received from the information processing device 100. As shown in FIG. 14, one or more sets of "the name of a location" and the "detailed information" about the information processing terminal in the location may be displayed on the screen as candidates to be connected. As shown in the example of "FREE SPACE C" shown in FIG. 14, when some terminals are in the same location, the several detailed information may be displayed collectively. The user may confirm the screen and easily recognize the remote terminal to which the user wants to connect.

The list of remote terminals selection unit 840 allows the user of the information processing terminal 120 to select a location (a remote terminal(s)) from the locations displayed by the list of remote terminals display unit 838.

The connection requesting unit 842 transmits a connection request to the information processing terminal which is in the location chosen by the user via the list of remote terminals selection unit 840. When some of the information processing terminals are displayed collectively in a single location as "FREE SPACE C" shown in FIG. 14, the connection request may be transmitted by specifying one of the information processing terminals. Predetermined priority information may be used to specify one of the information processing terminals, for example. The connection requesting unit 842 may use the connection information included in the list of remote terminals in order to transmit the connection request to the specified information processing terminal. In the remote conference system with the Peer-to-Peer model, the connection request may be transmitted to the remote terminal directly. In the remote conference system with the Client-Server model, the connection request may be transmitted to the information processing device 100, and the connection procedure may be performed in the information processing device 100. After the connection with the remote terminal establishes, the remote conference starts between the terminals on the remote conference software.

With the above stated function, the remote conference system 1 according to an embodiment of this invention allows the user of the information processing terminal to choose a remote terminal by displaying the name of a location (e.g. typically, the name of a room such as a conference room) where the remote terminal is placed. As a result, the user may accurately specify the remote party for the remote conference without relying on non-intuitive information such as an IP address or a telephone number. In addition, the user may specify the remote party intuitively by recognizing the product name or the owner of the remote terminal.

In the above stated example, the positional information about the information processing terminal 120 is conveyed via the PAN 180, and the connection information about the information processing terminal 120 is conveyed via the network 184 such as a wireless LAN. As a result, the information processing terminal may transmit the positional information which may be frequently updated with lower transmission power. On the other hand, the information processing terminal may execute the remote conference with a faster and broader network. However, this invention is not limited to the example, and the information may be transmitted via either network.

(4. Process Flow)

Figure 12:
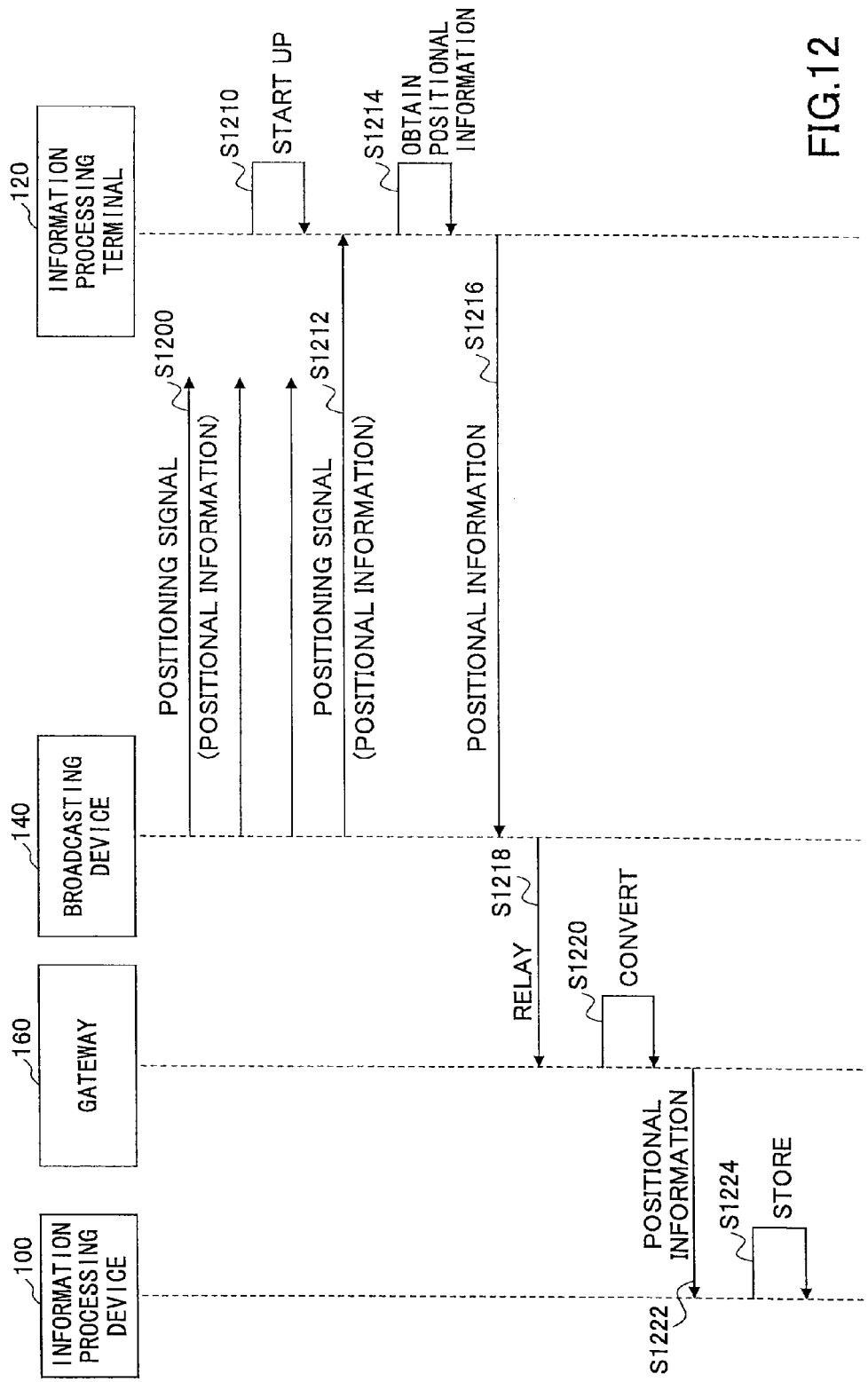
FIG. 12 is a sequence chart illustrating an exemplary process of administrating positional information performed by a remote conference system according to an embodiment.
Figure 13:
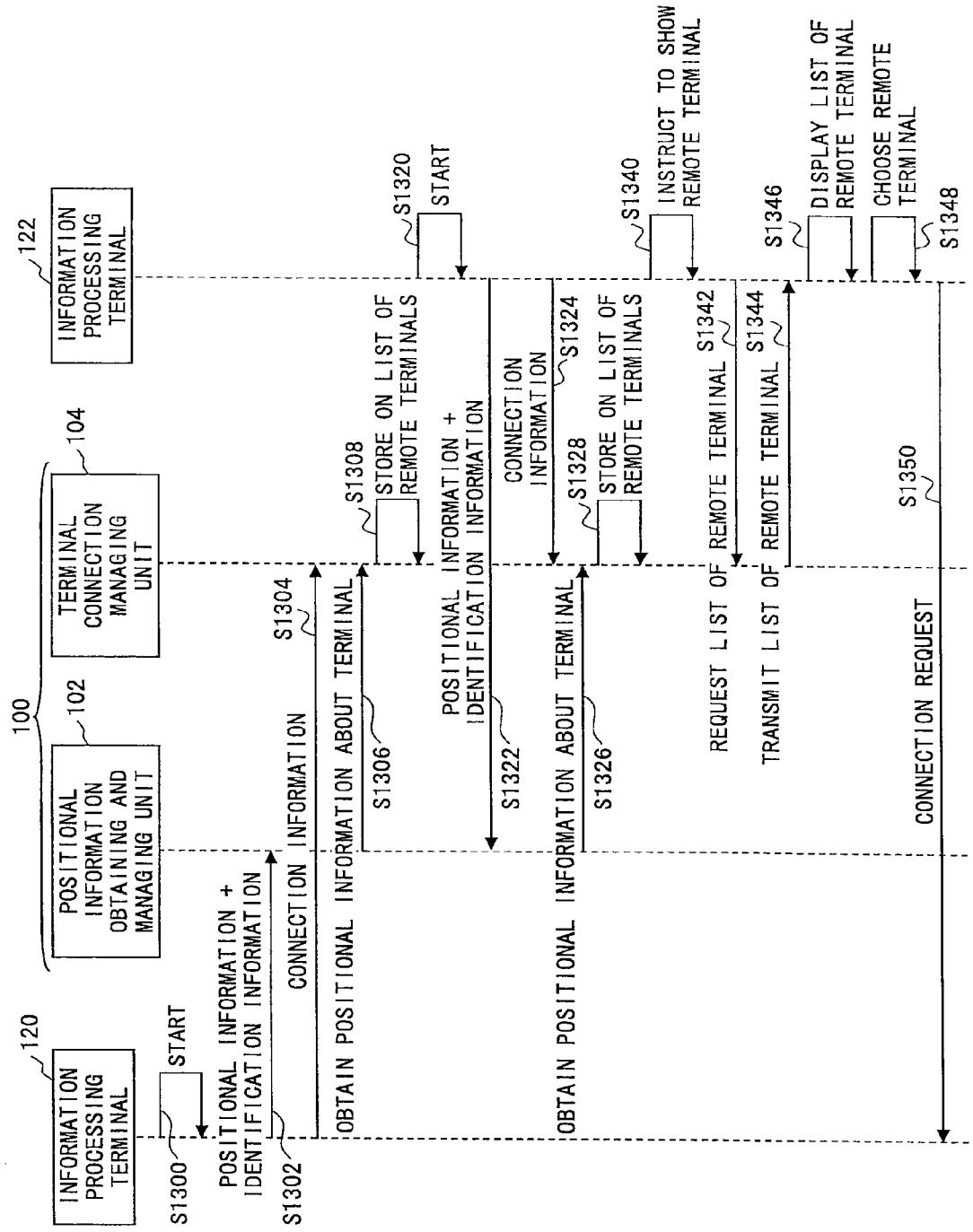
FIG. 13 is a sequence chart illustrating an exemplary process performed by a remote conference system according to an embodiment.

With reference to FIGS. 12, 13, the process of the remote conference system 1 according to an embodiment of this invention is explained.

(4.1 Process to Obtain Positional Information)

With reference to FIG. 12, the process in which the information processing device 100 obtains the current positional information about the information processing terminal 120 via the PAN 180 is explained. The process to obtain the positional information shown in FIG. 12 may be performed repeatedly regardless of the connection process for the remote conference described later.

In Step S1200, the positioning signal transmitting unit 802 of the broadcasting device 140 emits the positioning signal including the positional information.

In Step S1210, the information processing terminal 120 is started by the user.

In Step S1212, the positioning signal receiving unit 804 of the information processing terminal 120 receives the positioning signal transmitted by the positioning signal transmitting unit 802 of the broadcasting device 140.

In Step S1214, the positional information obtaining unit 806 of the information processing terminal 120 obtains the positional information from the positioning signal.

In Step S1216, the positional information transmitting unit 810 of the information processing terminal 120 transmits to the broadcasting device 140 the identification information stored in the identification information storage unit 808 as well as the positional information via the PAN 180.

In Step S1218, the relaying unit 812 of the broadcasting device 140 relays the positional information and the identification information received from the information processing terminal 120 to the gateway 160.

In Step S1220, the communication conversion unit 814 of the gateway 160 converts the data received from the network to which the broadcasting device 140 is connected so that the data is suitable for an external network such as a LAN or the Internet.

In Step S1222, the positional information receiving unit 816 of the information processing device 100 receives the positional information and the identification information about the information processing terminal 120 transmitted from the information processing terminal 120 via the broadcasting device 140 and the gateway 160.

In Step S1224, the positional information storage unit 818 of the information processing device 100 stores the received positional information and identification information about the information processing terminal 120. Here, the positional information storage unit 818 also stores the positional information and the identification information with receipt date and time of the positional information and detailed information associated with the identification information about the information processing terminal 120 in advance.

As the stated process, the information processing device 100 may manage the location of the information processing terminal 120.

(4.2 Process to Administrate Terminal Connection)

With reference to FIG. 13, the process is explained in which a information processing terminal 122 connects to the information processing device 100, obtains the connection information about the information processing terminal 120, and transmits a connection request for the remote conference. In FIG. 13, the information processing terminals 120, 122, and the two managing units included in the information processing device 100 (i.e. the positional information obtaining and managing unit 102 and the terminal connection managing unit 104) are illustrated. The process is explained according to the system configuration shown in FIG. 1. The process for storing the positional information about information processing terminals has already been described with reference to FIG. 12.

In Step S1300, the information processing terminal 120 ("LAPTOP001") is started by the user.

In Step S1302, the connection information transmitting unit 822 of the information processing terminal 120 transmits to the information processing device 100 the positional information (northern latitude of 35.668299 degrees, eastern longitude of 139.761588, 16th floor, "A" building) which indicates the present location of the information processing terminal 120 and which is obtained with the positioning signal from the broadcasting device 140. The positional information receiving unit 816 of the information processing device 100 receives the positional information.

In Step S1304, the connection information transmitting unit 822 of the information processing terminal 120 transmits to the information processing device 100 the connection information (e.g. the IP address "133.139.133.35") stored in the connection information storage unit 820 as well as the identification information about the information processing terminal 120 ("002673abcd01").

In Step S1306, the list of remote terminals managing unit 826 (the positional information obtaining unit 823) of the information processing device 100 obtains the positional information about the information processing terminal 120 by searching the information stored in the positional information storage unit 818 using the identification information "002673abcd01" transmitted with the connection information about the information processing terminal 120 as a key.

In Step S1308, the list of remote terminals managing unit 826 (positional information conversion unit 825) of the information processing device 100, using the table shown in FIG. 10, converts the positional information expressed by latitude, longitude, a floor number, and a building number (northern latitude of 35.668299 degrees, east longitude of 139.761588, 16th floor, "A" building) into the name of the location ("Reception Room A in Head Office"). The list of remote terminals managing unit 826 (list of remote terminals writing unit 827) of the information processing device 100 stores the name of the location and the identification information, the detailed information, and the connection information about the information processing terminal 120 on the list of remote terminals.

After that, the information processing terminal 122 (held by Mr. A) is started, and Steps S1320-S1328 are performed in common with Steps S1300-S1308. The list of remote terminals on the information processing device 100 includes an entry of Mr. A's information processing terminal 122 (the identification information "002673abcd02") located in "Meeting Room C1505 in Branch Office" (northern latitude of 35.460600 degrees, eastern longitude of 139.389200, 15th floor, "C" building).

In Step S1340, the information processing terminal 122 accepts an operation for displaying a list of potential remote terminals by the user to start the remote conference.

In Step S1342, the list of remote terminals transmission request unit 830 of the information processing terminal 122 transmits a list of remote terminals transmission request to the information processing device 100.

In Step S1344, the list of remote terminals transmission request accepting unit 832 of the information processing device 100 accepts the list of remote terminals transmission request from the information processing terminal 122, and transmits the list of remote terminals to the information processing terminal 122 via the list of remote terminals transmitting unit 834. The list of remote terminals receiving unit 836 of the information processing terminal 122 receives the list of remote terminals.

In Step S1346, the list of remote terminals display unit 838 of the information processing terminal 122 display information included in the list of remote terminals received from the information processing device 100 on the screen of the information processing terminal 122. FIG. 14 is an example of the screen. In this example, two locations are listed as remote parties according to the contents of the list of remote terminals shown in FIG. 11. As stated above, when some terminals are in a single location, the detailed information about the terminals may be displayed in the single location collectively as an example of "FREE SPACE C" shown in FIG. 14.

In Step S1348, the list of remote terminals selection unit 840 of the information processing terminal 122 allows the user to choose the remote party (terminal).

In Step S1350, the connection requesting unit 842 of the information processing terminal 122, using the connection information, transmits a connection request to the remote terminal in the location specified by the user. In this step, when the user chooses "Reception Room A in Head Office", the connection request is transmitted using the connection information "133.139.133.35" of the information processing terminal "LAPTOP001". When the connection to the remote terminal is established, the information processing terminals starts the remote conference with the remote conference software. When the remote conference system is implemented with the Client-Server model, the connection request is submitted to the information processing device 100.

In the above stated steps, the remote conference system 1 according to this embodiment allows the user to choose a remote party for the remote conference easily by showing locations (typically the name of a room such as a conference room). As a result, the user may accurately specify the remote party for the remote conference without relying on non-intuitive information such as an IP address or a telephone number. In addition, the user may specify the remote party intuitively by recognizing the product name or the owner of the remote terminal.

(5. Variants)
(5.1 First Variant)

Figure 15:
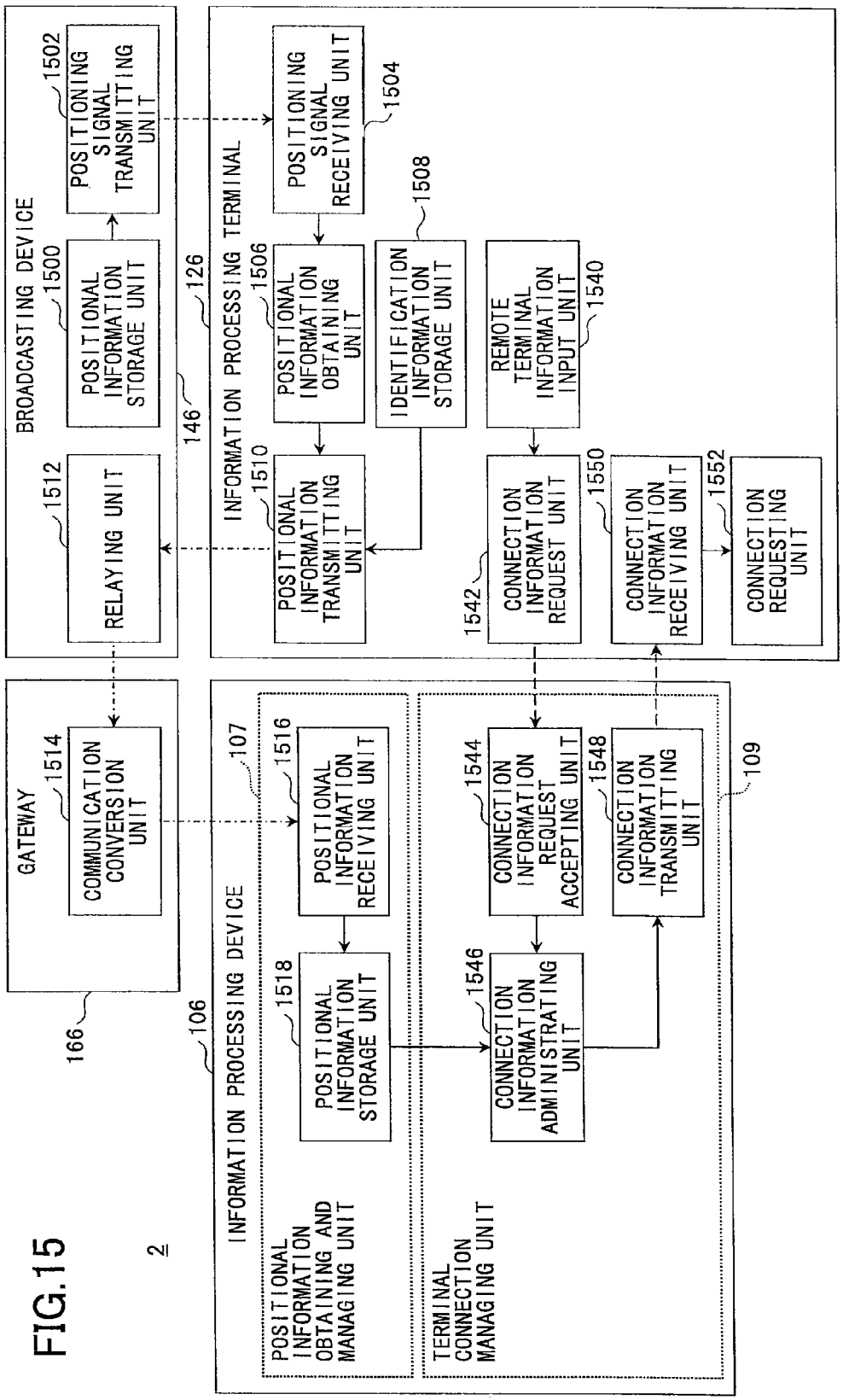
FIG. 15 is a block diagram illustrating exemplary functional configurations of an information processing device, information processing terminal, a broadcasting device, and a gateway according to an embodiment.
Figure 17:
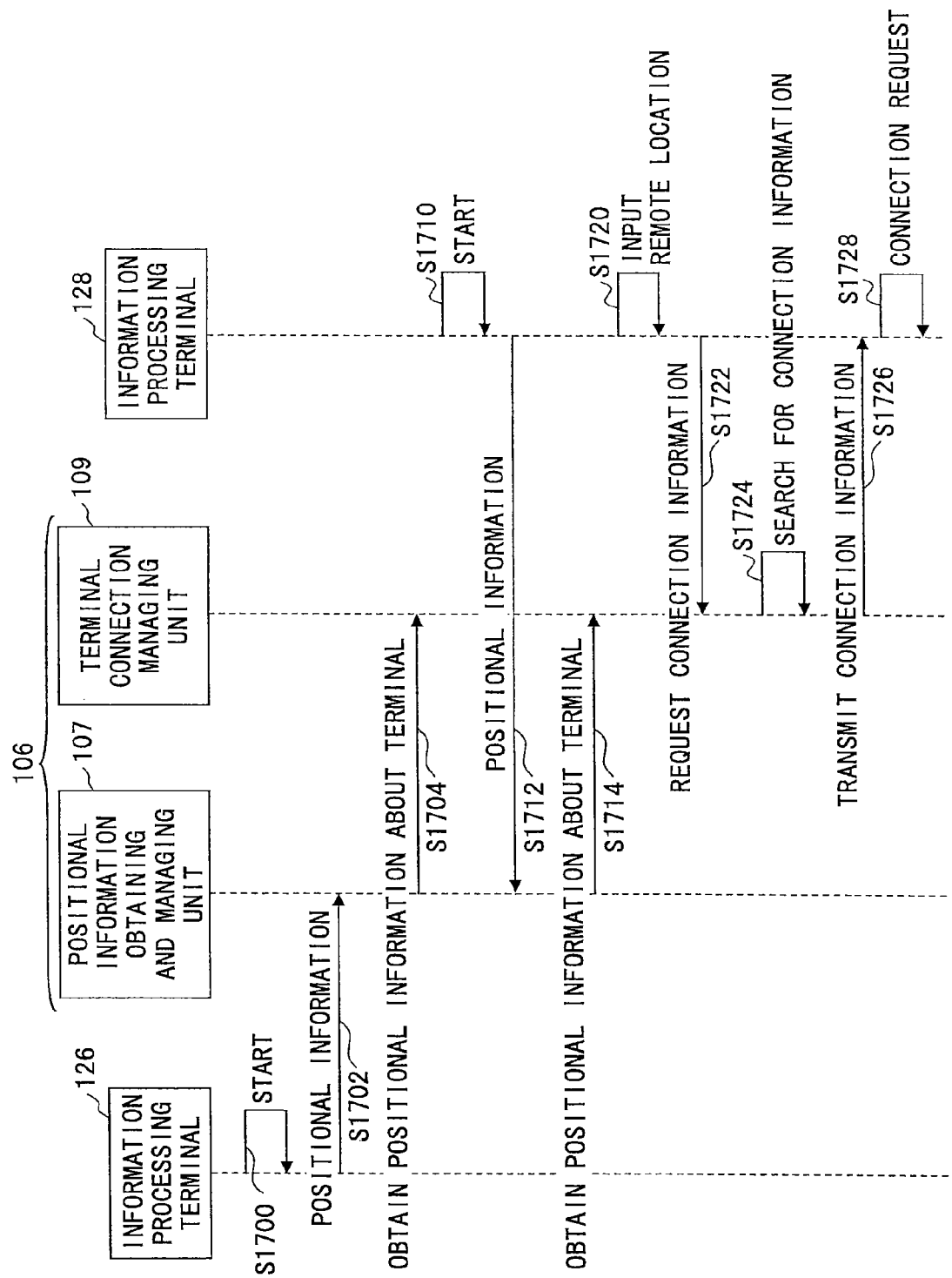
FIG. 17 is a sequence chart illustrating an exemplary process performed by a remote conference system according to an embodiment.

FIGS. 15-17 show the first variant of the remote conference system of this invention. In this variant, the remote conference is performed by voice communications. In this case, the user of the information processing terminal knows the name of the location where the other party is for the remote conference, but does not know connection information required to connect with the other party's terminal (i.e. a telephone number). In the remote conference system 2 of this variant, the information processing terminal sends inquiries to the information processing device about the connection information about the other party's terminal locating in the location input by the user.

With reference to FIG. 15, the functional block of the remote conference system 2 according to an embodiment of this invention is explained especially highlighting the differences from the functional block shown in FIG. 8.

A positional information storage unit 1500, a positioning signal transmitting unit 1502, and a relaying unit 1512 of a broadcasting device 146, a positioning signal receiving unit 1504, a positional information obtaining unit 1506, an identification information storage unit 1508 and a positional information transmitting unit 1510 of an information processing terminal 126, a communication conversion unit 1514 of a gateway 166, and a positional information receiving unit 1516 and a positional information storage unit 1518 of an information processing device 106 work in common with the units having the same name in FIG. 8.

Unlike the information processing terminal 120 in FIG. 8, the information processing terminal 126 has a connection information request unit 1542, connection information receiving unit 1550, and a connection requesting unit 1552.

The remote terminal information input unit 1540 accepts user input for the name of the location where the remote terminal is. An example of the name of the location is "Reception Room A in Head Office", which is known to the user in advance. The remote terminal information input unit

Figure 18:
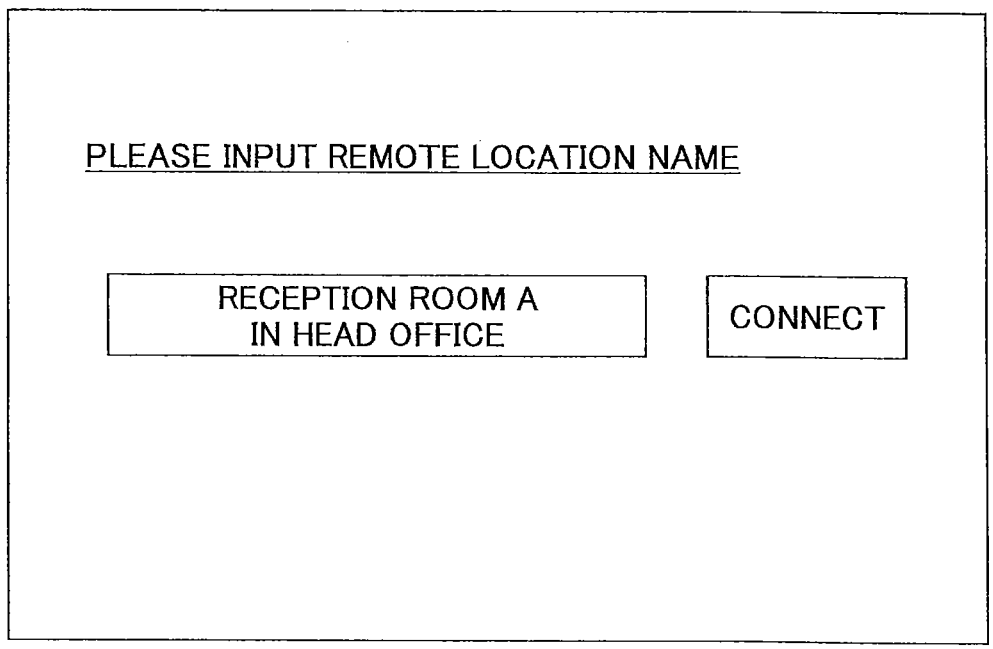
FIG. 18 is a drawing illustrating a display screen of an information processing terminal according to an embodiment.

1540 may accept the user input by displaying a screen on the information processing terminal shown in FIG. 18.

The connection information request unit 1542 transmits to the information processing device 106 a connection information request which allows the information processing device 106 to transmit the connection information about the information processing terminal locating in the location accepted by the remote terminal information input unit 1540. The request may be transmitted to the information processing device 106 via a wireless network such as a wireless LAN.

The connection information receiving unit 1550 receives from the information processing device 106 the connection information about the information processing terminal locating in the location input by the user.

The connection requesting unit 1552 transmits a connection request to the remote terminal using the received connection information. In this variant, a telephone number is used as the connection information. Thus, the information processing terminal 126, using the telephone number, and establishes a dial connection with the remote terminal.

Unlike the information processing device 100 shown in FIG. 8, the information processing device 106 has a connection information request accepting unit 1544, connection information administrating unit 1546, and a connection information transmitting unit 1548.

The connection information request accepting unit 1544 accepts the connection information request from the information processing terminal 126. The connection information request includes information about the name of the location input by the user.

The connection information administrating unit 1546 receives the information about the name of the location from the connection information request accepting unit 1544, and converts the information into the positional information about the degree of latitude and longitude, the floor number, and the building number using the known table shown in FIG. 10. Next, the connection information administrating unit 1546 searches for an entry of the information processing terminal whose location is indicated by the positional information in the information stored in the positional information storage unit 1518 (FIG. 9). When finding the entry of the information processing terminal, the connection information administrating unit 1546 obtains the identification information. The connection information administrating unit 1546, using the identification information, searches for and specifies the connection information of the information processing terminal in a table associating the identification information with the connection information shown in FIG. 16 (e.g. an address book). The connection information administrating unit 1546 passes the connection information to the connection information transmitting unit 1548.

The connection information transmitting unit 1548 transmits the specified connection information to the information processing terminal 126.

With the above stated function, the information processing terminal 126 in the first variant may obtain the connection information about the remote terminal located in the location specified by the user from the information processing device 106, and transmits the connection request to the remote terminal.

In this example, the connection information (the telephone number) is assigned to each information processing terminal, however, it may be assigned for each location. In this case, when the connection information administrating unit 1546 receives the information about the name of the location from the connection information request accepting unit 1544, the connection information administrating unit 1546 may directly obtain the connection information using a table shown in FIG. 19. The table shown in FIG. 19 associates the name of the location with the positional information in common with the table shown in FIG. 10. The table shown in FIG. 19 further includes the known connection information about each location. The obtained connection information is conveyed to the connection information transmitting unit 1548.

Figure 21:
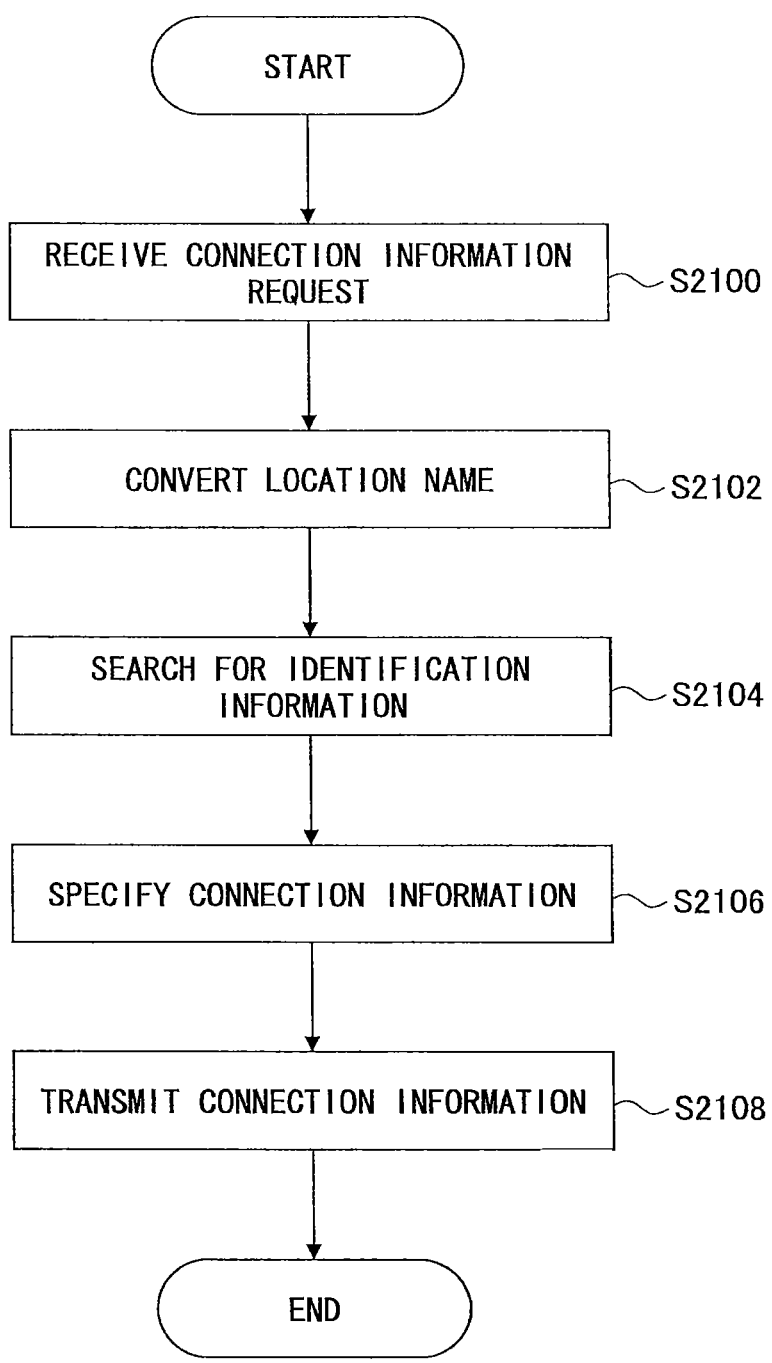
FIG. 21 is a flowchart illustrating a process performed by a connection information administrating unit according to an embodiment.

FIG. 21 shows a flowchart illustrating the process performed by a terminal connection managing unit 109 including the connection information administrating unit 1546. First, the connection information request accepting unit 1544 receives the connection information request including the name of the location input by the user from the information processing terminal 120 (Step S2100). Second, the connection information administrating unit 1546, using the table shown in the FIG. 10, converts the name of the location (e.g. "Reception Room A in Head Office") into the positional information including the degree of latitude and longitude, the floor number, and the building number (e.g. northern latitude of 35.668299 degrees, eastern longitude of 139.761588, 16th floor, "A" building) (Step S2102). Next, the connection information administrating unit 1546 searches for the identification information about the information processing terminal having the positional information from the information stored in the positional information storage unit 1518 (FIG. 9) (Step S2104). Next, the connection information administrating unit 1546 retrieves the table associating the identification with the connection information shown in FIG. 16 using the identification information as a key, and specifies the connection information about the information processing terminal (Step S2106). Next, the connection information transmitting unit 1548 transmits the specified connection information to the information processing terminal 128 (Step S2108).

FIG. 17 shows the process performed by the remote conference system 2 in this variant. The process is explained according to the system configuration shown in FIG. 1.

The information processing terminal 126 located in "Reception Room A in Head Office" and the information processing terminal 128 located in "Meeting Room C1505 in Branch Office" transmits the positional information to the information processing device 106 in common with the information processing terminals shown in FIG. 13 (Step S1700-S1704, S1710-S1714). Unlike the processes shown in FIG. 13, the connection information is not transmitted by information processing terminals since the connection information (the telephone number) has already been associated with the identification information with the table shown in FIG. 16.

In Step S1720, the remote terminal information input unit 1540 of the information processing terminal 128 accepts user input of the name of the location for the remote party. FIG. 18 shows an example of the screen for accepting the user input. Here, the user of the information processing terminal 128 located in "Meeting Room C1505 in Branch Office" is about to start the remote conference with the remote terminal located in "Reception Room A in Head Office".

In Step S1722, the connection information request unit 1542 of the information processing terminal 128 transmits to the information processing device 106 the connection information request including the name of the location input by the user. The connection information request accepting unit 1544 of the information processing device 106 receives the connection information request.

In Step S1724, the connection information administrating unit 1546 of the information processing device 106, using the table shown in FIG. 10, converts the name of the location (e.g. "Reception Room A in Head Office") into the positional information expressed by latitude, longitude, a floor number, and a building number (e.g. northern latitude of 35.668299 degrees, eastern longitude of 139.761588, 16th floor, "A" building). Next, the connection information administrating unit 1546 searches for the identification information about the information processing terminal having the positional information from the information stored in the information storage unit 1518 (FIG. 9). In this example, the connection information administrating unit 1546 may obtain the identification information "002673abcd01". In addition, the connection information administrating unit 1546, using the identification information as a key, searches the table associating the identification information with the connection information shown in FIG. 16, and specifies the connection information about the information processing terminal 126. Here, the connection information administrating unit 1546 specifies the connection information "03-1234-5678".

In Step S1726, the connection information transmitting unit 1548 of the information processing device 106 transmits the specified connection information to the information processing terminal 128. The connection information receiving unit 1550 of the information processing terminal 128 receives the connection information.

In Step S1728, the connection requesting unit 1552 of the information processing terminal 128 transmits the connection request to the remote terminal located in "Reception Room A in Head Office" using the received connection information. In this example, the connection information is expressed by the telephone number, and the connection request is transmitted by dialing using the telephone number.

With the above stated function, the information processing terminal in the remote conference system 2 may accept the name of a location from the user, and obtain the connection information about the remote terminal located in the location from the information processing device 106. As a result, in case the user does not know the connection information about the other party (i.e. the telephone number), the user of the information processing terminal may start the remote conference using the name of the location of the remote party.

(5.2 Second Variant)

Next, the second variant of this invention is explained. In the above examples, the information processing terminal 120 in the remote conference system may receive the positioning signal broadcast by the broadcasting device 140 and obtain the positional information. On the other hand, an information processing terminal 120A in this example does not have a positioning signal receiving unit for receiving the positioning signal from the broadcasting device. Alternatively, a wireless terminal 120B such as a small tag, which may receive the positioning signal, is attached to the information processing terminal 120A.

Figure 22:
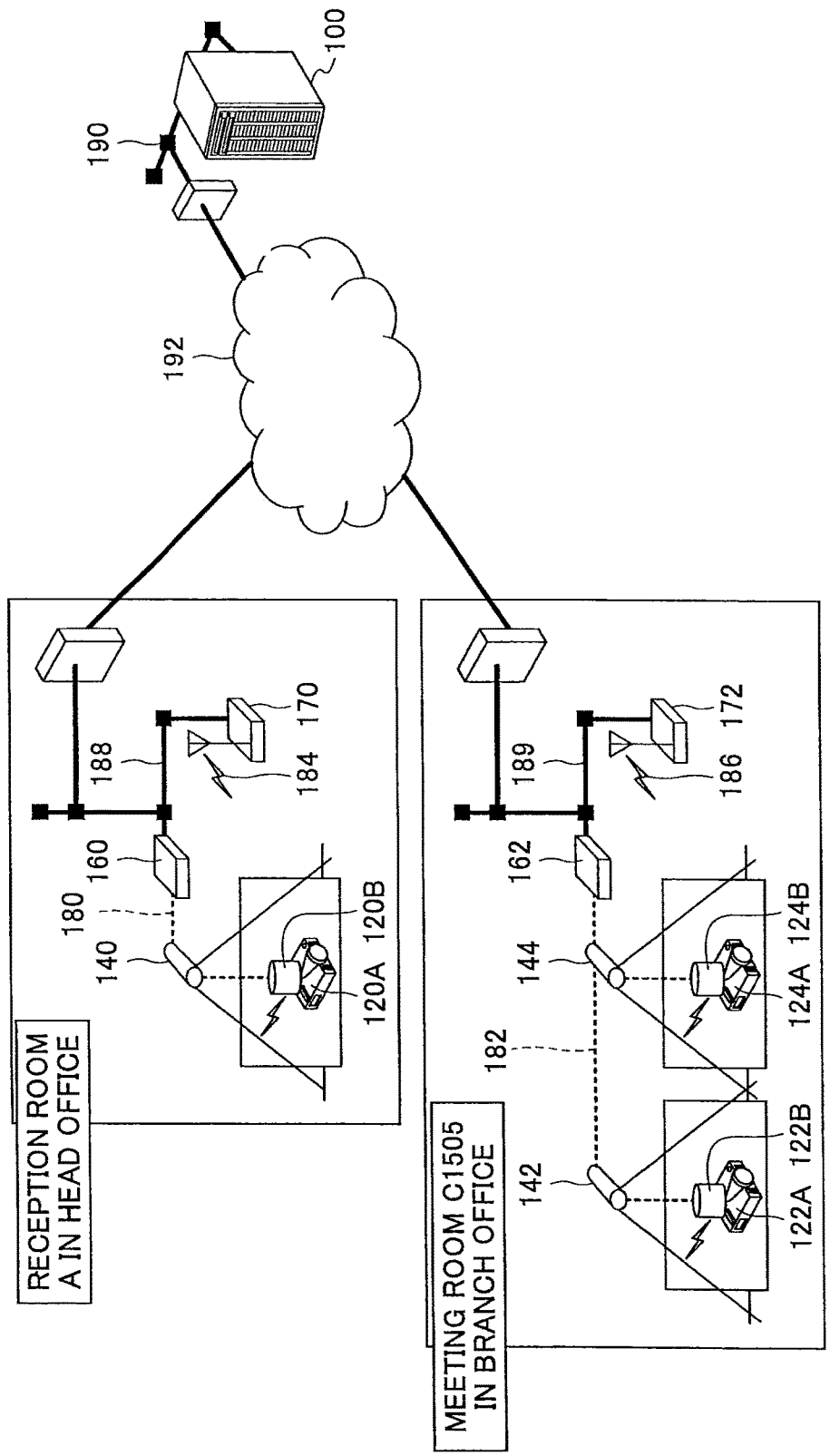
FIG. 22 is a drawing illustrating an overview of a remote conference system according to an embodiment.

FIG. 22 shows an example of an application for the remote conference system according to this example. As shown in FIG. 22, the information processing terminals 120A, 122A, 124A according to this example may be projectors (or remote conference terminals with projection function) which may execute a remote conference. In addition, the wireless terminals 120B, 122B, 124B are attached to the information processing terminal 120A, 122A, 124A respectively. Each wireless terminal may be attached to the information processing terminal in any manner (e.g. using a magnet or a dedicated attachment). The wireless terminals 120B 124B receive the positioning signal broadcast by the broadcasting devices 140-144. The wireless terminals 120B-124B may transmit the obtained positional information to the information processing device 100A via the PANs 180, 182.

The wireless terminal may usually be in a sleep state, and when the wireless terminal receives any event which occurs in periodical or non-periodical intervals (e.g. a timer event or a detection of acceleration), the wireless terminal may resume from the sleep state. After the wireless terminals 120B-124B resumes from the sleep state, the wireless terminals 120B-124B receive the positioning signal and transmit the positional information, and then go to sleep again.

The information processing terminals 120A-124A transmit the connection information and their model information to the information processing device 100A via the wireless networks 184, 186 or the wired networks 188, 189. The transmission is done independently from the transmission of the positional information performed by the wireless terminals 120B-124B. The model information corresponds to the detailed information used in the other examples (FIGS. 9, 11, 32). The information processing device 100A in this example may associate the connection information received from the information processing terminal 120A with the positional information received from the wireless terminal 120B using the known model information (the detailed information) and the identification information.

With that configuration, this invention may be applied to the information processing terminal which does not have the positioning signal receiving unit.

Figure 23:
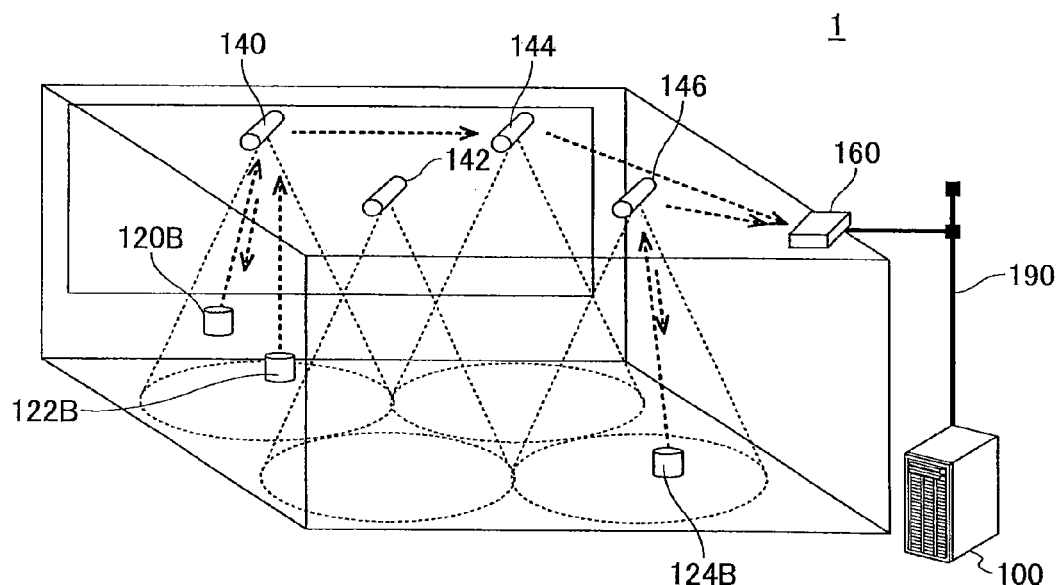
FIG. 23 is a drawing illustrating an exemplary configuration of a PAN used in to an embodiment.

FIG. 23 is a drawing illustrating the PAN 180 including the wireless terminals 120B-124B attached to the information processing terminals 120A-124A, the broadcasting devices 140-146, and the gateway 160. The PAN 180 may be formed according to a short range wireless communication technology such as ZigBee™. The PAN 180 and the external network 190 to which the information processing device 100A is connected are interconnected via the gateway 160.

Figure 24:
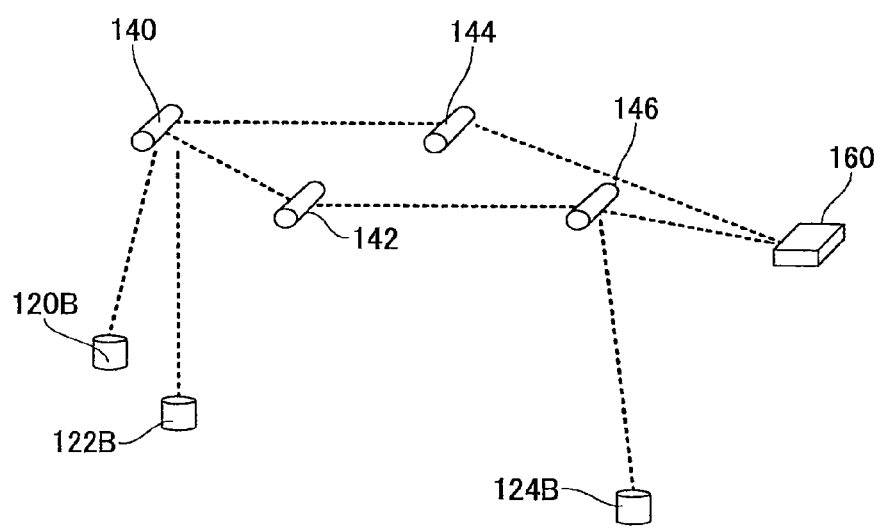
FIG. 24 is a drawing illustrating an exemplary configuration of a PAN used in to an embodiment.

FIG. 24 simply shows the wireless terminals 120B-124B, the broadcasting devices 140-146, and the gateway 160 included in the PAN 180 shown in FIG. 23. As shown in FIG. 24, wireless terminals may transmit the positional information to the nearest broadcasting devices. Therefore, the wireless terminals may communicate with the nearest broadcasting device by emitting electric waves with power which is enough to reach the nearest broadcasting device. The power is relatively lower than the power normally required to emit electric waves so as to only reach a single access point. That effect is especially advantageous when the power consumption of the wireless terminals 120B-124B has to be reduced as much as possible.

Figure 25:
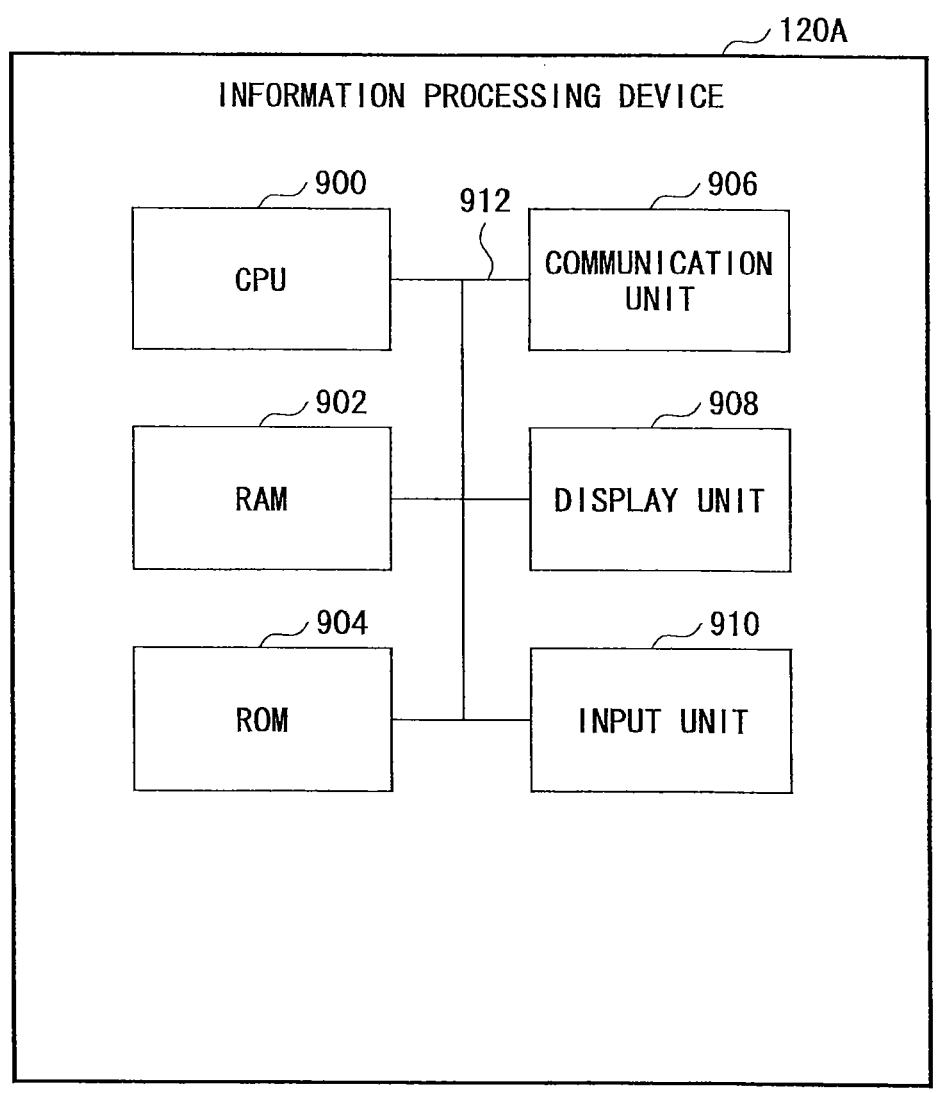
FIG. 25 is a block diagram illustrating an exemplary hardware configuration of an information processing terminal according to an embodiment.
Figure 26:
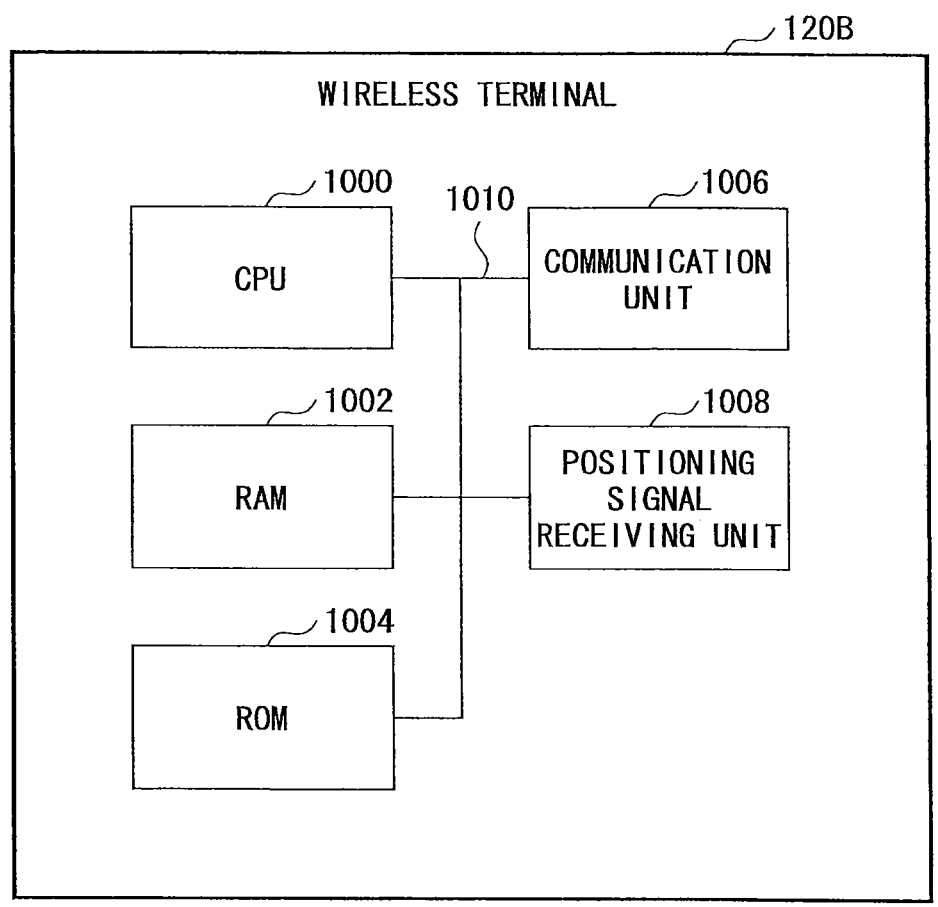
FIG. 26 is a block diagram illustrating an exemplary hardware configuration of a wireless terminal according to an embodiment.

With reference to FIGS. 25, 26, hardware configurations are explained for the information processing terminal 120A and the wireless terminal 120B in this example. Here, the hardware configurations of the information processing device 100, the broadcasting device 140 and the gateway 160 are in common with the configuration shown in FIGS. 4, 6, 7 and repeated explanations will be omitted.

(Information Processing Terminal)

FIG. 25 shows an exemplary hardware configuration of the information processing terminals 120A (the following explanation refers to only the information processing terminal 120A) in this example. The information processing terminal 120A includes a CPU 900, a RAM 902, a ROM 904, a communication unit 906, a display unit 908, an input unit 910, and a bus 912.

The CPU 900 executes programs controlling the information processing terminal 120A. The RAM 902 may operate as a working memory for the CPU 900. The ROM 904 stores programs executed by the CPU 900 and data required by the programs. Also, the ROM 904 may store user applications and data. The communication unit 906 is a device to communicate with an external device using a wireless LAN or a wired LAN. The display unit 908, such as a liquid crystal display or a projection unit of the projector may visually provide information to the user. The input unit 910, such as a touch panel or mechanical buttons, may accept input from the user. The bus 912 interconnects the above units electrically.

With the above configuration, the information processing terminal 120A in this example may communicate with the information processing device 100A via the wireless or wired network, and execute the remote conference by generating the screen about the remote conference.

(Wireless Terminal)

FIG. 26 shows an exemplary hardware configuration of the wireless terminals 120B-124B (the following explanation refers to only the information processing terminal 120B) in this example. The wireless terminal 120B includes a CPU 1000, a RAM 1002, a ROM 1004, a communication unit 1006, a positioning signal receiving unit 1008, and a bus 1010.

The CPU 1000 executes programs controlling the information processing terminal 120B. The RAM 1002 may operate as a working memory for the CPU 1000. The ROM 1004 stores programs executed by the CPU 1000 and data required by the programs. The first communication unit 1006 is a device to communicate with an external device according to a short range wireless communication technology such as ZigBee™ or Bluetooth™. The positioning signal receiving unit 1008 is a device to receive the positioning signal transmitted by the broadcasting device 140. The positioning signal receiving unit 1008 may receive the positioning signal including a frame format defined in IMES standard, for example. The bus 1010 interconnects the above units electrically.

With the above stated configuration, the wireless terminal 120B in this example may obtain the present positional information using the positioning signal transmitted by the broadcasting device 140. In addition, the wireless terminal 120B may communicate with the information processing device 100A via the PAN.

(Functions)

Figure 27:
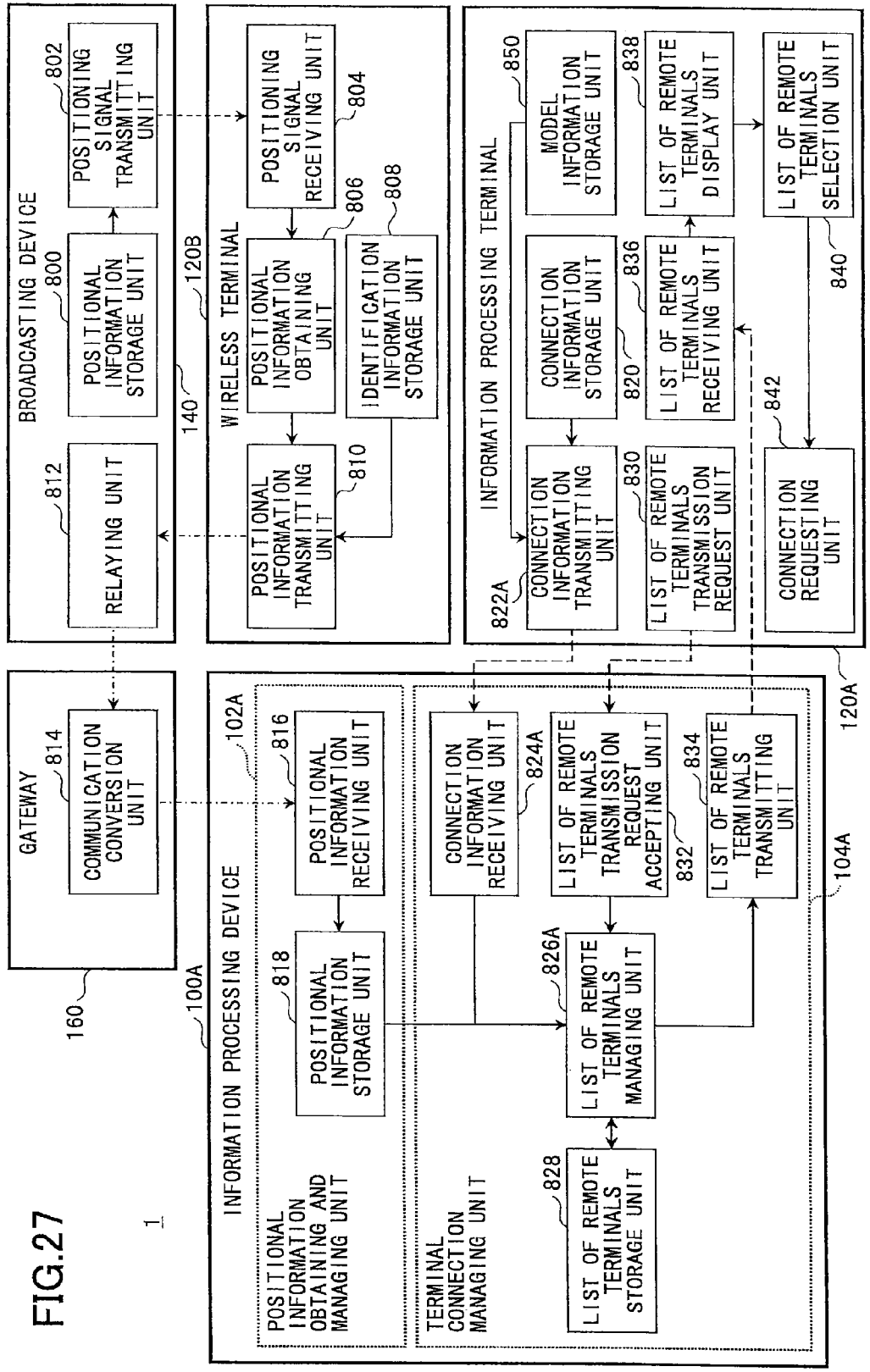
FIG. 27 is a block diagram illustrating exemplary functional configurations of an information processing device, information processing terminal, a wireless terminal, a broadcasting device, and a gateway according to an embodiment.

With reference to FIG. 27, the configuration of the function block in this example is explained especially highlighting differences from the function block shown in FIG. 8.

(Information Processing Terminal)

Unlike the information processing terminal 120 shown in FIG. 8, the information processing terminal 120A in this example does not have the positioning signal receiving unit, the positional information obtaining unit, the identification information storage unit, and the positional information transmitting unit which allow the information processing terminal 120A to receive the positioning signal, obtain the positional information, and transmit the positional information to the information processing device 100A. Alternatively, the information processing terminal 120A has a model information storage unit 850.

The model information storage unit 850 stores the model information about the information processing terminal 120A (such as "UCS P2000" expressed by any strings). The model information is treated as the "detailed information" in the information processing device 100A.

The model information is associated with the identification information about the wireless terminal 120B attached to the information processing terminal 120A.

The connection information transmitting unit 822A transmits to the information processing device 100A the connection information stored in the connection information storage unit 820 (such as an IP address) and the model information stored in the model information storage unit 850. Other functions of the information processing terminal 120A are in common with the information processing terminal 120 shown in FIG. 8.

(Wireless Terminal)

The wireless terminal 120B in this example has the positioning signal receiving unit 804, the positional information obtaining unit 806, the identification information storage unit 808, and the positional information transmitting unit 810, which are included in the information processing terminal 120 shown in FIG. 8. Their functions are in common with ones of the information processing terminal 120 shown in FIG. 8. The wireless terminal 120B transmits the obtained positional information and the identification information to the information processing device 100A via the broadcasting device 140 and the gateway 160.

(Broadcasting Device and Gateway)

The broadcasting device 140 in this example transmits the positioning signal for the wireless terminal 120B. In addition, the broadcasting device 140 and the gateway in this example relay the positional information and the positional information transmitted by the wireless terminal 120B to the information processing device 100A.

(Information Processing Device)

The connection information receiving unit 824A of the information processing device 100A in this example may receives the connection information and the model information transmitted from the connection information transmitting unit 822A of the information processing terminal 120A, and pass the information to the list of remote terminals managing unit 826A. Here, the connection information receiving unit 824A may pass the model information to the list of remote terminals managing unit 826A as the detailed information.

Figure 35:
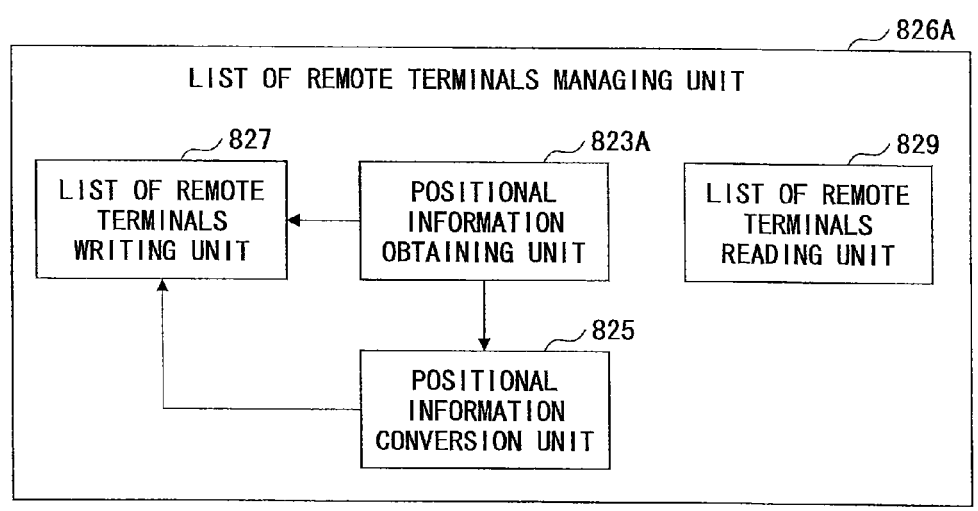
FIG. 35 is a detailed block diagram illustrating exemplary functional configurations of a list of remote terminals administrating unit.

FIG. 35 shows a detailed functional block of the list of remote terminals managing unit 826A. When the positional information obtaining unit 823A of the list of remote terminals managing unit 826A in this example receives the detailed information (the model information) and the connection information from the connection information receiving unit 824A, the positional information obtaining unit 823A obtains the identification information and the positional information about the wireless terminal 120B (FIG. 9) using the received detailed information. Next, the positional information obtaining unit 823A conveys the degree of latitude and longitude, the floor number, and the building number from the obtained positional information (the latitude, the longitude, the floor number, the building number, the receipt data and time, and the detailed information) to the positional information conversion unit 825. In addition, the positional information obtaining unit 823A conveys the identification information, the connection information, and the detailed information about the wireless terminal to the list of remote terminals writing unit 827.

Other functions are in common with ones of the information processing device 100 shown in FIG. 8.

(Process Flow)

Figure 28:
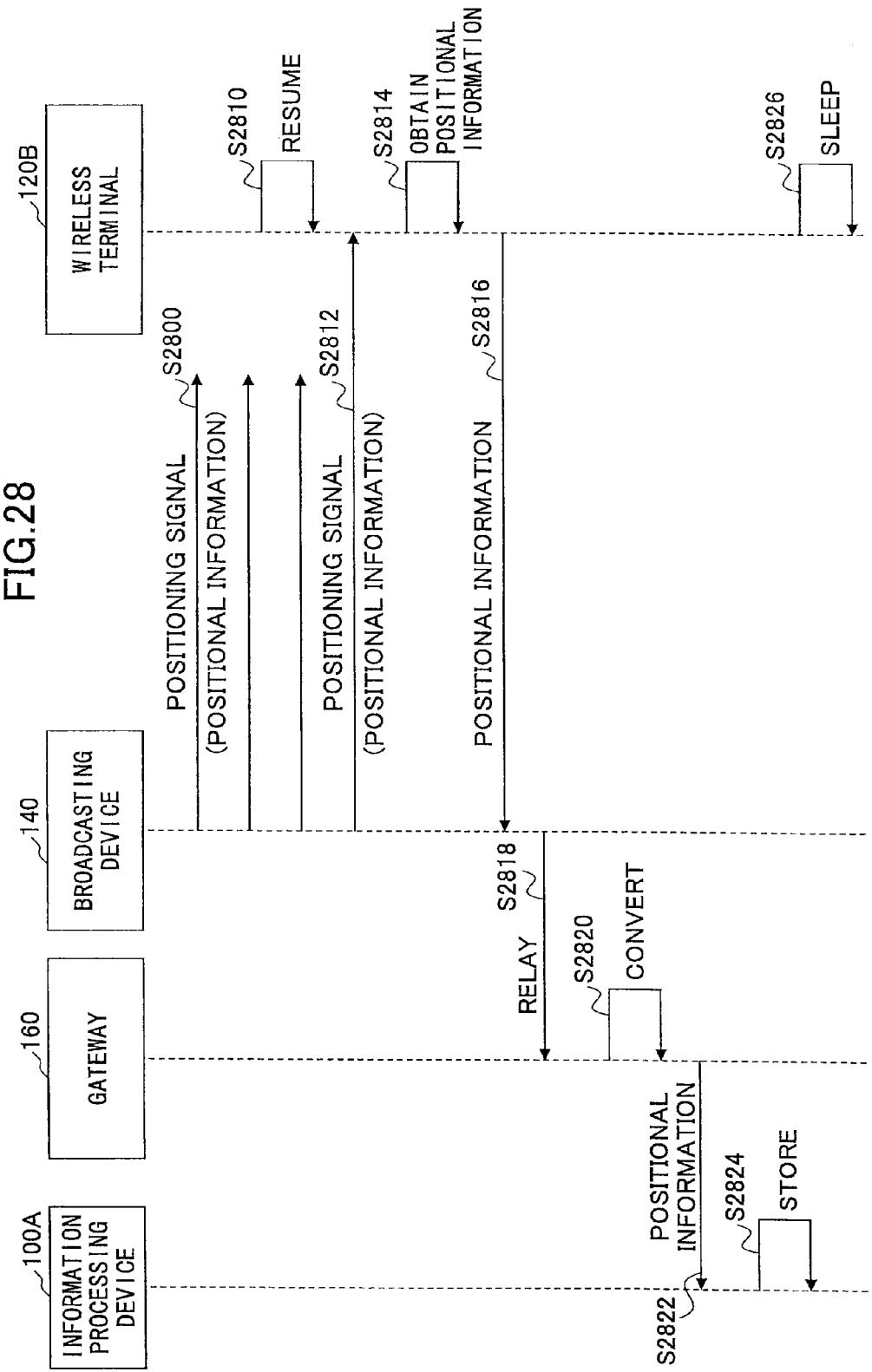
FIG. 28 is a sequence chart illustrating an exemplary process of administrating positional information performed by a remote conference system according to an embodiment.
Figure 29:
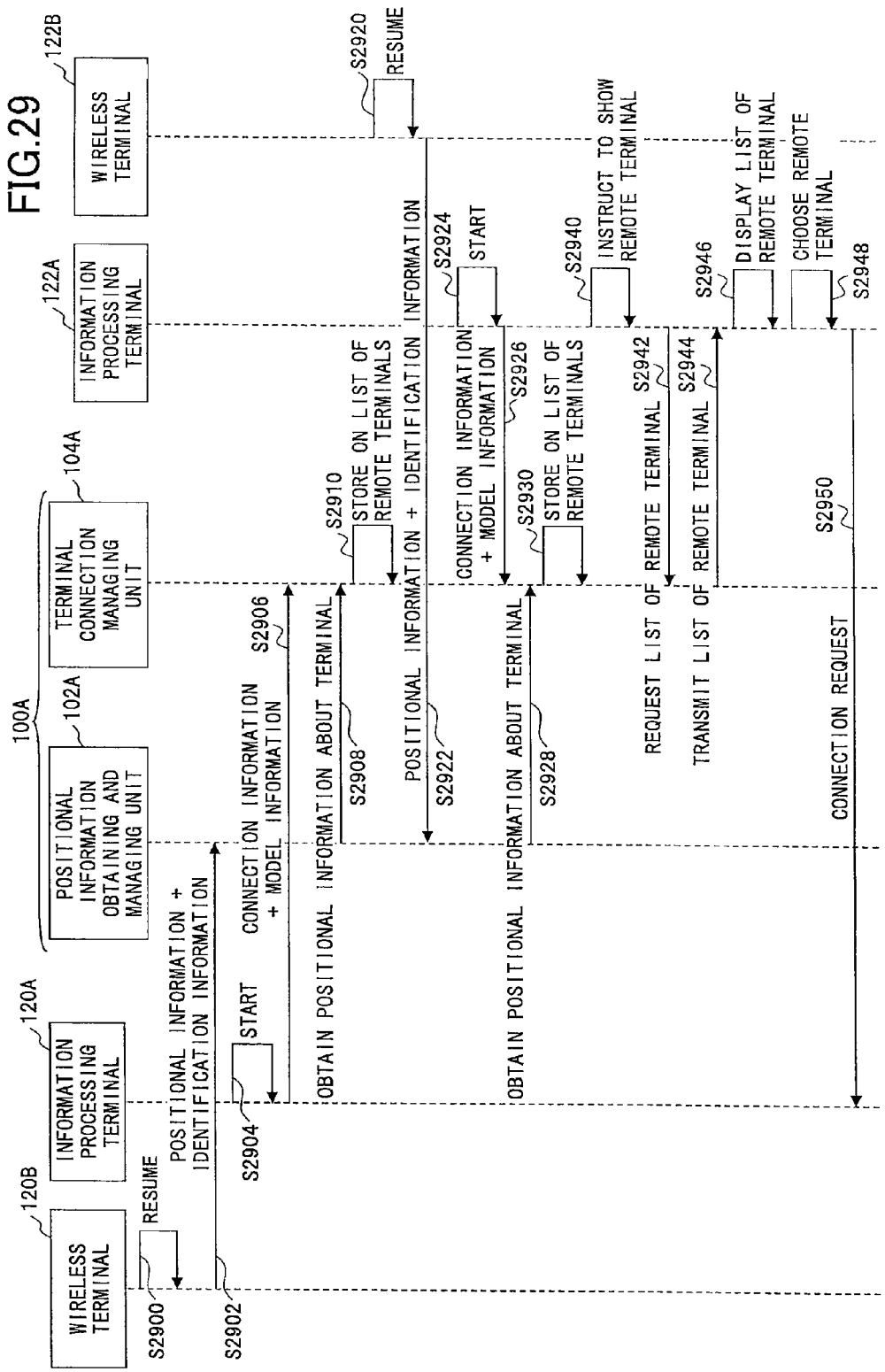
FIG. 29 is a sequence chart illustrating an exemplary process performed by a remote conference system according to an embodiment.

With reference to FIGS. 28, 29, the process of the remote conference system 2 in this example is explained.

(Process to Obtain Positional Information)

In Step S2800, the positioning signal transmitting unit 802 of the broadcasting device 140 emits the positioning signal including the positional information in the same manner as Step S1200 shown in FIG. 12.

In Step S2810, the wireless terminal 120B may resume from the sleep state. depending on an occurrence of any periodical or non-periodical event such as a detection of acceleration.

In Step S2812, the positioning signal receiving unit 804 of the wireless terminal 120B receives the positioning signal transmitted by the positioning signal transmitting unit 802 of the broadcasting device 140.

In Step S2814, the positional information obtaining unit 806 of the wireless terminal 120B obtains the positional information from the positioning signal.

In Step S2816, the positional information transmitting unit 810 of the wireless terminal 120B transmits to the broadcasting device 140 the identification information stored in the identification information storage unit 808 as well as the positional information via the PAN 180.

In Step S2818, the relaying unit 812 of the broadcasting device 140 relays the positional information and the identification information received from the information processing terminal 120 to the gateway 160.

In Step S2820, the communication conversion unit 814 of the gateway 160 converts the data received from the network to which the broadcasting device 140 is connected so that the data is suitable for the external network such as a LAN or the Internet.

In Step S2822, the positional information receiving unit 816 of the information processing device 100A receives the positional information and the identification information about the wireless terminal 120B transmitted from the wireless terminal 120B via the broadcasting device 140 and the gateway 160.

In Step S2824, the positional information storage unit 818 of the information processing device 100A stores the received positional information and identification information about the wireless terminal 120B. Here, the positional information storage unit 818 also stores the positional information and the identification information with receipt date and time of the positional information and detailed information (the model information) associated with the identification information about the information processing terminal 120 in advance.

In Step S2826, the wireless terminal 120B goes into the sleep state again.

With the above process, the information processing device 100A in this example may manage the position of the information processing device 120A associated with the wireless terminal 120B.

(Process to Administrate Terminal Connection)

With reference to FIG. 29, the process is explained in which an information processing terminal 122A connects to the information processing device 100A, obtains the connection information about the information processing terminal 120A, and transmits a connection request for the remote conference. In FIG. 29, the information processing terminals 120A, 122A, the wireless terminals 120B, 122B, and the two managing units included in the information processing device 100A (i.e. the positional information obtaining and managing unit 102A and the terminal connection managing unit 104A) are illustrated. The process is explained according to the system configuration shown in FIG. 22. The process for storing the positional information about each wireless terminal has already been described with reference to FIG. 28.

In Step S2900, the wireless terminal 120B resumes from the sleep state.

In Step S2902, the wireless terminal 120B transmits the positional information and the identification information to the information processing device 100A according to the process shown in FIG. 28. Here, the positional information indicates northern latitude of 35.668299 degrees, eastern longitude of 139.761588, 16th floor, "A" building.

In Step S2904, the information processing terminal 120A (the model information is "UCS P2000") is started by the user.

In Step S2906, the connection information transmitting unit 822A of the information processing terminal 120A transmits to the information processing device 100A the connection information (e.g. the IP address "133.139.133.35") stored in the connection information storage unit 820 as well as the model information ("UCS P2000").

In Step S2908, the list of remote terminals managing unit 826A (the positional information obtaining unit 823A) of the information processing device 100A obtains the positional information about the information processing terminal 120A by searching the information stored in the positional information storage unit 818 using the model information "UCS P2000" transmitted with the connection information about the information processing terminal 120A as a key.

In Step S2910, the list of remote terminals managing unit 826A (positional information conversion unit 825) of the information processing device 100A, using the table shown in FIG. 10, converts the positional information expressed by latitude, longitude, a floor number, and a building number (northern latitude of 35.668299 degrees, eastern longitude of 139.761588, 16th floor, "A" building) into the name of the location ("Reception Room A in Head Office") The list of remote terminals managing unit 826A (list of remote terminals writing unit 827) of the information processing device 100A stores the name of the location, the identification information about the wireless terminal 120B, the detailed information (the model information) about the information processing terminal 120A, and the connection information on the list of remote terminals.

After that, when the wireless terminal 122B (the identification information "002673abcd02") resumes from the sleep state and the information processing terminal 122A (the model information "UCS P2550") is started, Steps S2920-S2930 are executed in common with Steps S2900-S2910. Here, the wireless terminal 122B receives the positional information (northern latitude of 35.460600 degrees, eastern longitude of 139.389200, 15th floor, "C" building) from the broadcasting device. An entry of the information processing terminal 122A located in "Meeting Room C1505 in Branch Office" is stored on the list of remote terminals on the information processing device 100A.

Steps S2940-S2950 for communication of the list of remote terminals and initiation of the remote conference are performed in common with Steps S1340-S1350 shown in FIG. 13.

With the above process, the remote conference system in this example allows the user of the information processing terminal which does not have the positioning signal receiving unit to choose a remote party for the remote conference easily by showing locations (typically the name of a room such as a conference room).

(5.3 Third Variant)

Next, the third variant of this invention is explained with reference to FIGS. 30, 31. The remote conference used in this example is performed by voice communications. The remote conference is executed on the information processing terminal used by the user. Here, in common with the second variant, the information processing terminal does not have the positioning signal receiving unit, and the wireless terminal attached to the information processing terminal receives the positioning signal and the positional information. The information processing terminal and the wireless terminal is associated by the model information about the information processing terminal and the identification information about the wireless terminal in advance.

(Hardware Configurations and Functions)

The hardware configurations of the information processing terminal 126A and the wireless terminal 126B in this example are similar to the information processing terminal 120A and the wireless terminal 120B shown in FIGS. 25, 26.

Figure 30:
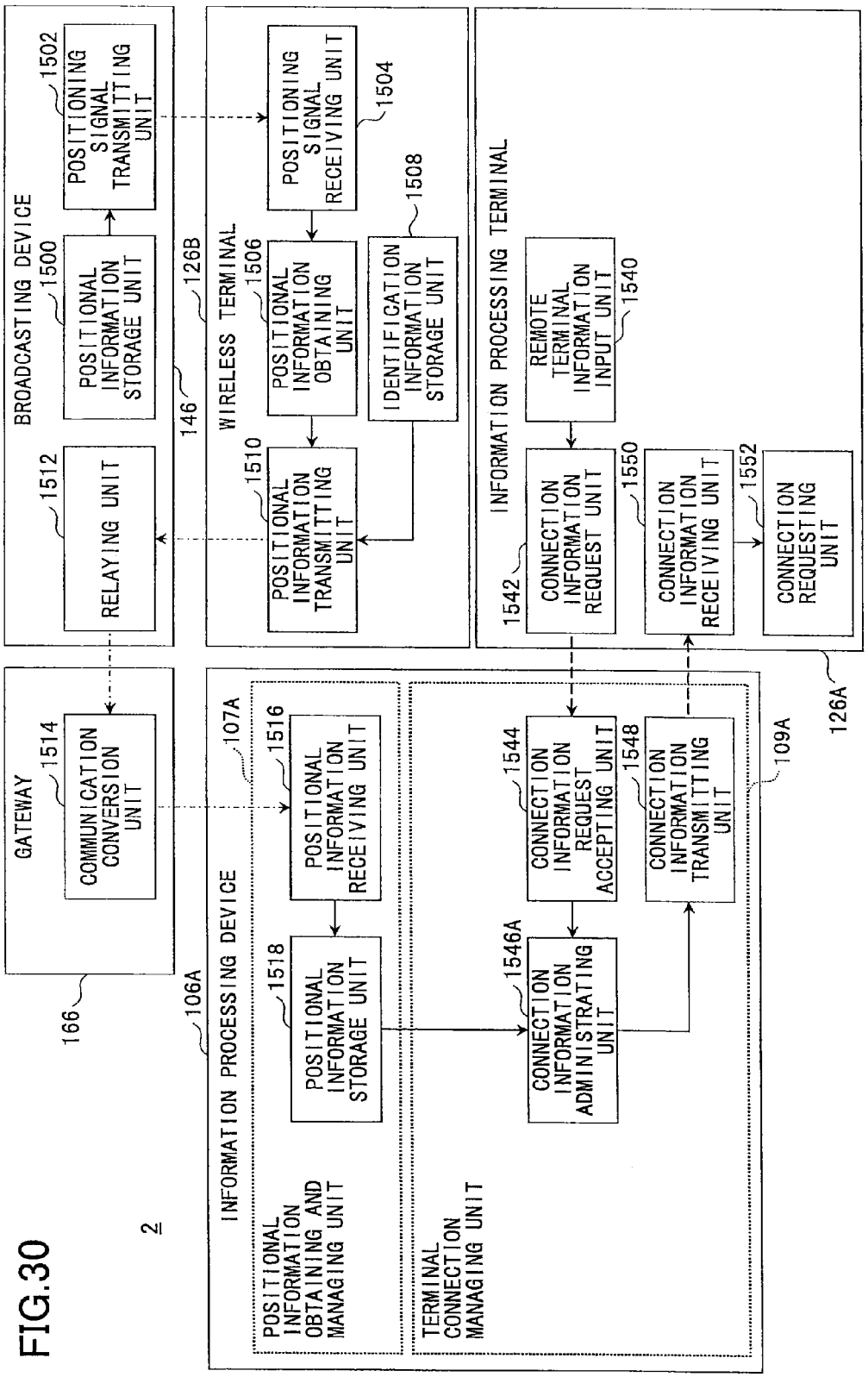
FIG. 30 is a block diagram illustrating exemplary functional configurations of an information processing device, information processing terminal, a wireless terminal, a broadcasting device, and a gateway according to an embodiment.

With reference to FIG. 30, the functional block of the remote conference system in this variant is explained especially highlighting the differences from the functional block shown in FIG. 15 (the first variant).

The information processing terminal 126A in this variant does not have the positioning signal receiving unit, the positional information obtaining unit, the identification information storage unit, and the positional information transmitting unit similar to the information processing terminal 120A in the second variant (FIG. 27).

The wireless terminal 126B is attached to the information processing terminal 126A in this variant. The wireless terminal 126B has the positioning signal receiving unit 1504, the positional information obtaining unit 1506, the identification information storage unit 1508, and the positional information transmitting unit 1510, and obtains the positional information broadcast by the broadcasting device 146. The wireless terminal 126B transmits the identification information and the positional information to the information processing device 107A via the broadcasting device 146 and the gateway 166.

(Process Flow)

Figure 31:
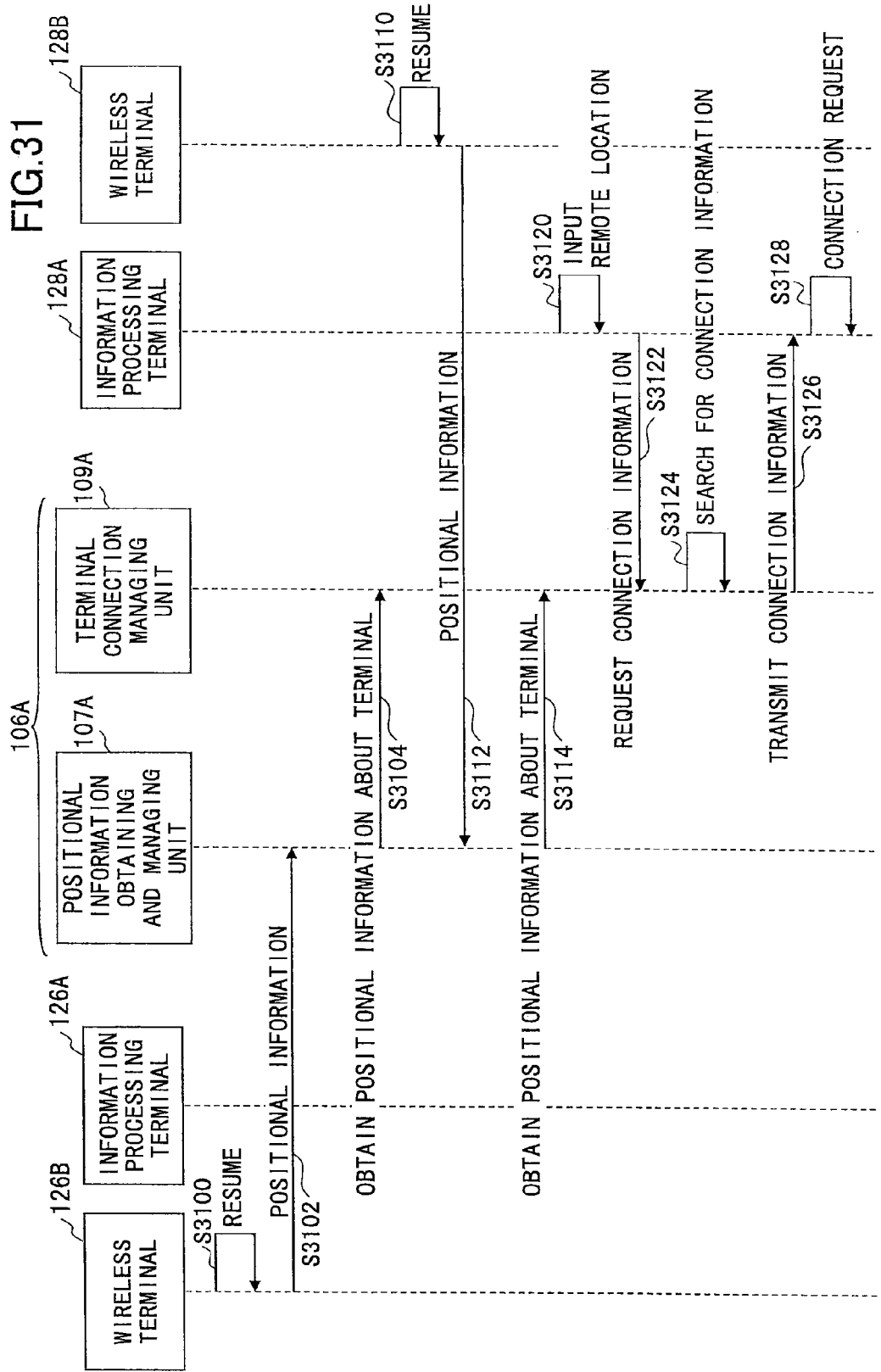
FIG. 31 is a sequence chart illustrating an exemplary process performed by a remote conference system according to an embodiment.

With reference to FIG. 31, the process of the remote conference system in this variant is explained according to the system configuration shown in FIG. 22.

The wireless terminal 126B attached to the information processing terminal 126A located in "Reception Room A in Head Office" and the wireless terminal 128B attached to the information processing terminal 128A located in "Meeting Room C1505 in Branch Office" resume from the sleep state (Steps S3100, S3110). Next, the wireless terminals 126B, 128B transmit the positional information to the information processing device 106A in common with the process shown in FIG. 28 (Steps S3102, S3112). Next, the terminal connection managing unit 109A of the information processing device 106A obtains the positional information about the wireless terminals (Steps S3104, S3114). Unlike the process shown in FIG. 29 (the second variant), the connection information (the telephone number) is not transmitted by each information processing terminal since the connection information has already been associated with the identification information with the table shown in FIG. 16.

After that, Steps S3120-S3128 for accepting user input of the name of the location and transmitting the connection request are performed in common with Steps S1720-S1728 in FIG. 17.

With the above stated function, the information processing terminal in the remote conference system of this variant, which does not have the positioning signal receiving unit, may accept the name of a location from the user and obtain the connection information about the remote terminal located in the location from the information processing device 106. As a result, in case the user does not know the connection information about the other party (i.e. the telephone number), the user of the information processing terminal may start the remote conference using the name of the location of the remote party.

CROSS-REFERENCE TO RELATED APPLICATIONS

The present application is based upon and claims the benefit of priority of Japanese Patent Application No. 2012-202645 filed on Sep. 14, 2012, and Japanese Patent Application No. 2013-182174 filed on Sep. 3, 2013, the entire contents of which are incorporated herein by reference.

Patent Document

[Patent Document 1] Japanese Laid-open Patent Publication No. 2011-160393

What is claimed is:

1. A communication system comprising:
a plurality of information processing terminals; and
an information processing device communicating with the information processing terminals, the information processing device including circuitry configured to
obtain positional information about a potential information processing terminal to be connected, included in the information processing terminals,
convert the positional information of the potential information processing terminal to be connected that is obtained into a name of a location which corresponds to the positional information of the potential information processing terminal to be connected, and
transmit the name of the location to an information processing terminal which is different from the information processing device and the potential information processing terminal to be connected and which transmits a connection request to the potential information processing terminal after the name of the location is transmitted, wherein
the information processing terminal which transmits the connection request includes a display configured to display, before the connection request is transmitted to the potential information processing terminal, the name of the location that is transmitted.

2. The communication system as claimed in claim 1, wherein the circuitry is further configured to
obtain connection information about the information processing terminals, and
transmit the connection information that is obtained as well as the name of the location to the information processing terminal which transmits the connection request.

3. The communication system as claimed in claim 2, wherein the information processing terminal which transmits the connection request includes terminal circuitry configured to
accept an input to select the name of the location displayed by the display, and
transmit the connection request to the potential information processing terminal located in the selected location using the connection information that is transmitted.

4. The communication system as claimed in claim 2, wherein the circuitry transmits the detailed information including a product name of the potential information processing terminal as well as the name of the location and the connection information.

5. The communication system as claimed in claim 4, wherein the display displays the product name as well as the name of the location.

6. The communication system as claimed in claim 1, wherein the circuitry obtains the positional information by receiving the positional information from the potential information processing terminal which obtains the positional information from a positioning signal received from a broadcasting device.

7. The communication system as claimed in claim 1, wherein the circuitry obtains the positional information by receiving the positional information from a wireless terminal attached to the potential information processing terminal which obtains the positional information from a positioning signal received from a broadcasting device.

8. The communication system as claimed in claim 6, wherein the positioning signal is constructed according to an indoor positioning process.

9. An information processing device communicating with a plurality of information processing terminals, the information processing device comprising:
   circuitry configured to
      obtain positional information about a potential information processing terminal to be connected, included in the information processing terminals,
      convert the positional information of the potential information processing terminal to be connected that is obtained into a name of a location which corresponds to the positional information of the potential information processing terminal to be connected, and
      transmit the name of the location to an information processing terminal which is different from the information processing device and the potential information processing terminal to be connected and which transmits a connection request to the potential information processing terminal after the name of the location is transmitted.

10. The information processing device as claimed in claim 9, wherein the circuitry is further configured to
   obtain connection information about the information processing terminals, and
   transmit the connection information that is obtained as well as the name of the location to the information processing terminal which transmits the connection request.

11. The information processing device as claimed in claim 10, wherein the circuitry transmits the detailed information including a product name of the potential information processing terminal as well as the name of the location and the connection information.

12. The information processing device as claimed in claim 9, wherein the circuitry obtains the positional information by receiving the positional information from the potential information processing terminal which obtains the positional information from a positioning signal received from a broadcasting device.

13. The information processing device as claimed in claim 9, wherein the circuitry obtains the positional information by receiving the positional information from a wireless terminal attached to the potential information processing terminal which obtains the positional information from a positioning signal received from a broadcasting device.

14. The information processing device as claimed in claim 12, wherein the positioning signal is constructed according to an indoor positioning process.

15. A method for an information processing device, the method comprising:
   obtaining positional information about a potential information processing terminal to be connected;
   converting the positional information of the potential information processing terminal to be connected obtained by the obtaining into a name of a location which corresponds to the positional information of the potential information processing terminal to be connected; and
   transmitting the name of the location to an information processing terminal which is different from the information processing device and the potential information processing terminal to be connected and which transmits a connection request to the potential information processing terminal after the name of the location is transmitted.

16. The communication system as claimed in claim 1, wherein the display of the information processing terminal which transmits the connection request is further configured to display the name of the location that is transmitted along with a product name identifying a type of the potential information processing terminal.

* * * * *